United States Patent [19]

Parri et al.

[11] Patent Number: 5,543,075
[45] Date of Patent: Aug. 6, 1996

[54] LIQUID CRYSTALLINE MATERIAL

[75] Inventors: Owain L. Parri, Poole; Emma J. Brown, Weymouth; David Coates, Wimborne; Mark J. Goulding, Poole, all of Great Britain

[73] Assignee: Merck Patent Gesellschaft Mit Beschrankter Haftung, Darmstadt, Germany

[21] Appl. No.: 244,518

[22] PCT Filed: Sep. 20, 1993

[86] PCT No.: PCT/EP93/02539

§ 371 Date: Jun. 1, 1994

§ 102(e) Date: Jun. 1, 1994

[87] PCT Pub. No.: WO94/08268

PCT Pub. Date: Apr. 14, 1994

[30] Foreign Application Priority Data

Oct. 2, 1992 [GB] United Kingdom ............... 9220750

[51] Int. Cl.⁶ .................... C09K 19/152; G02F 1/13
[52] U.S. Cl. .................... 252/299.01; 359/103; 428/1
[58] Field of Search ............... 252/299.01, 299.61, 252/299.66; 359/103, 52; 428/1

[56] References Cited

U.S. PATENT DOCUMENTS

| 5,068,053 | 11/1991 | Reiffenrath et al. | 252/299.61 |
| 5,188,760 | 2/1993 | Hikner et al. | 252/299.01 |
| 5,198,149 | 3/1993 | Reiffenrath et al. | 252/299.61 |
| 5,268,783 | 12/1993 | Yoshinaga et al. | 252/299.01 |
| 5,270,843 | 1/1993 | Wang | 359/52 |
| 5,273,680 | 12/1993 | Gray et al. | 252/299.66 |
| 5,305,126 | 4/1994 | Kobayashi et al. | 359/52 |
| 5,356,557 | 10/1994 | Jubb et al. | 252/299.01 |

FOREIGN PATENT DOCUMENTS

| 0451905 | 10/1991 | European Pat. Off. . |
| 0492668 | 7/1992 | European Pat. Off. . |
| 2282718 | of 0000 | Japan . |
| 484972 | 5/1992 | Japan . |
| WO-A-88/07514 | 10/1988 | WIPO . |

OTHER PUBLICATIONS

Hikmet, "Electrically induced light scattering from anisotropic gels", *Proceedings Eurodisplay* (10th Internat. Display Research Conf. Sep. 25–27, 1990), pp. 286–289.

*Primary Examiner*—Shean C. Wu
*Attorney, Agent, or Firm*—Millen, White, Zelano, & Branigan, P.C.

[57] ABSTRACT

The invention relates to a liquid crystalline material in the form of an anisotropic gel consisting of a polymerized monotropic or enantiotropic liquid crystalline material and a low-molecular weight liquid crystalline material, wherein the polymerized material a) forms a permanently oriented network in the low-molecular liquid crystalline material b), characterized in that the low-molecular weight liquid crystalline material b) exhibits a dielectric anisotropy $\Delta\epsilon < -0.5$, and to a display cell with such a material.

19 Claims, No Drawings

LIQUID CRYSTALLINE MATERIAL

The invention relates to a liquid crystalline material in the form of an anisotropic gel consisting of a polymerized monotropic or enantiotropic liquid crystalline material and a low-molecular weight liquid crystalline material, wherein the polymerized material a) forms a permanently oriented network in the low-molecular weight liquid crystalline material b), characterized in that the low-molecular weight liquid crystalline material b) exhibits a dielectric anisotropy $\Delta\epsilon < -0.5$.

The invention further relates to a display cell comprising two opposite plates which are transparent to light as the substrate, which plates are provided with an electrode of a material which is transparent to light on the sides facing each other, said electrode carrying an orientation layer and a sealing material being provided between the ends of the plates, a liquid-crystalline material being introduced in the space between the plates and the sealing material which is in the form of, for example, a ring.

In European Patent Application EP 451,905 a liquid crystalline material in the form of an anisotropic gel comprising a polymerized liquid crystalline material and a low-molecular weight liquid crystalline material which exhibits a positive dielectric anisotropy. Furthermore EP 451,905 suggests also the use of low-molecular weight liquid crystalline material with a negative dielectric anisotropy, but there is no hint that such gels do not produce polarized light, operate at low voltages, being compatible with active matrix addressing and have fast response times.

In accordance with the invention, a liquid crystalline material as described in the opening paragraph is obtained, wherein polymerized material a) forms a permanently oriented network in the low-molecular liquid weight crystalline material b), characterized in that the low-molecular weight liquid crystalline material exhibits a dielectric anisotropy $\Delta\epsilon < -0.5$. Preferably, said material b) forms a continuous phase around the network of material a).

Preferred embodiments of the invention are:
a) A liquid crystalline material wherein material a) is selected from acrylates, epoxy compounds, vinyl ether compounds and thiolene compounds.
b) A liquid crystalline material wherein material b) is a liquid crystalline medium comprising at least two components wherein at least one component is a mesogenic compound comprising a structure element selected from the formulae 1 to 5:

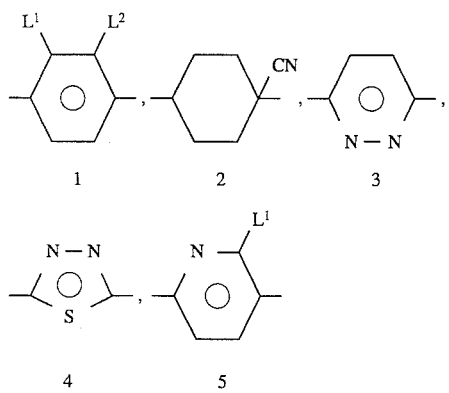

wherein $L^1$ is F, Cl, CN, $CF_3$, and $L^2$ is H or $L^1$, in particular: a liquid crystalline material wherein the material b) contains at least one compound of formula I

 (I)

wherein
$R^1$ and $R^2$ are each independently alkyl or alkenyl with up to 16 C atoms, in which one or two non-adjacent $CH_2$ groups may be replaced by —O—, —CO—O—, —O—CO— or —O—CO—O—, one of $R^1$ and $R^2$ may also be F, Cl, $CF_3$, $OCF_3$ or $OCF_2H$
$A^1$ and $A^2$ are each independently optionally fluorinated 1,4-phenylene in
which one or two CH groups may be replaced by N, or 1,4-cyclohexylene in which one or two non-adjacent CH2 groups may be replaced by O,
$Z^1$ and $Z^2$ are each independently —CO—O—, —O—O—, —OCH2—, —CH2O—, —CH$_2$CH$_2$—, —C≡C—, —C≡C—C≡C— or a single bond,
—A— is selected from the structure elements of formulae 1 to 5, and
m and n are each independently 0, 1, 2 or 3 with the proviso that the sum of m+n is 1, 2 or 3,
preferably wherein —A— is

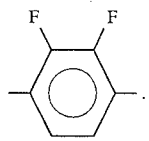

The invention relates in particular to materials wherein the material b) comprises at least one compound of formula Ia

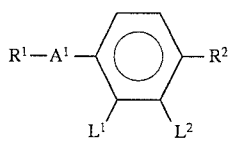

in which
$R^1$ is an alkyl or an alkenyl group each having up to 12 C atoms and in which, in addition one or more non-adjacent $CH_2$ groups may be replaced by a divalent radical selected from —O—, —S—, —CO—, —O—CO— and —CO—O—. $A^1$ is a divalent ring structure selected from

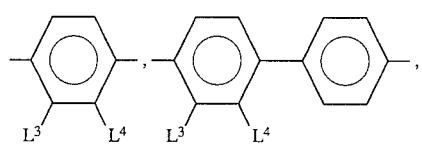

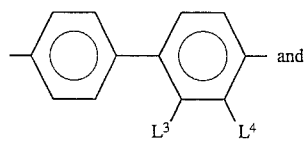

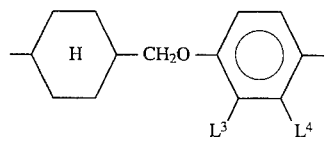

$R^2$ is a thio alkyl or an alkoxy group each having up to 7 C atoms and in which, in addition one or more non-adjacent $CH_2$ groups may be replaced by a divalent radical selected from —O—, —CO— and —CH=CH—, and $L^1$ to $L^4$ are each H or F with the proviso that $L^1=L^2=F$ and/or $L^3=L^4=F$.
c) A liquid crystalline material wherein the material a) is a polymerizable rod-like compound of the formula II $R^1—P—X—A^3—Z—A^4—R^2$     II wherein $R^1$ is $CH_2=CW—COO—$,

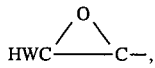

$HWN—$, $CH_2=CH—$ or $HS—CH_2—(CH_2)_m—COO—$ with W being H, Cl or alkyl with 1–5 C atoms and m being 1–7

P is alkylene with up to 12 C atoms, it being also possible for one or more non adjacent $CH_2$ groups to be replaced by $—O—$, $R^2$ is an alkyl radical with up to 15 C atoms which is unsubstituted, mono- or polysubstituted by halogen, it being also possible for one or more CH2 groups in these radicals to be replaced, in each case independently of one another, by $—O—$, $—S—$, $—CO—$, $—OCO—$, $—CO—O—$ or $—O—CO—O—$ in such a manner that oxygen atoms are not linked directly to one another, or alternatively $R^2$ has one of the meanings given for $R^1—P—X—$, $A^3$ is a 1,4-phenylene or a naphthalene-2,6-diyl radical which is unsubstituted or substituted with 1 to 4 halogen atoms, $A^4$ is

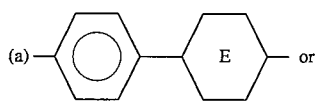

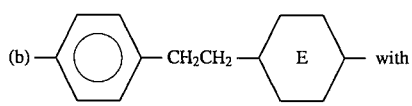

with

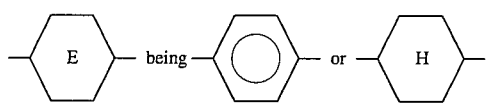

it being possible for radicals (a) and (b) to be substituted by CN or halogen and one of the 1,4-phenylene groups in (a) and (b) can also be replaced by a 1,4-phenylene radical in which one or two CH groups are replaced by N, and Z is $—CO—O—$, $—O—CO—$, $—CH_2CH_2—$ or a single bond, furthermore a liquid crystalline material wherein the material a) is a bis-(meth)acrylate of formula IIA $$CH_2=\underset{R}{\underset{|}{C}}-\underset{O}{\underset{||}{C}}-O-[(CH_2)_m-A]_n-B-[A-(CH_2)_m]_n-O-\underset{O}{\underset{||}{C}}-\underset{R}{\underset{|}{C}}=CH_2 \quad IIA$$

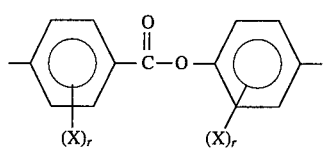

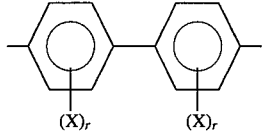

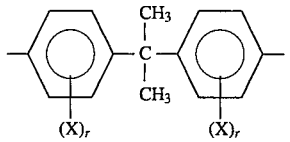

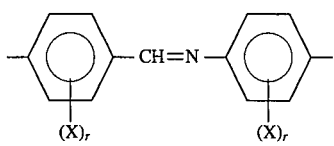

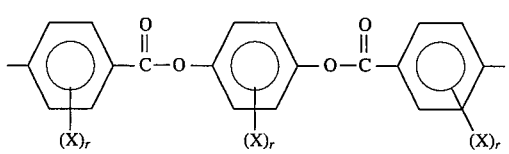

with X being $CH_3$, Cl or F and r being 0, 1 or 2,
s is an integer between 1 and 6, and
n and m are integers between 0 and 20.

d) A liquid crystalline material wherein material a) is present in the gel in a quantity of 1–50 % by weight, in particular 5–20%.

e) A liquid crystalline material wherein the material b) exhibits a dielectric anisotropy $\Delta\epsilon \leq 0.5$ and an optic anisotropy $\Delta n \geq 0.15$.

f) A liquid crystalline material wherein the material b) contains at least one mesogenic tolane derivative comprising a structural element of the formula 6

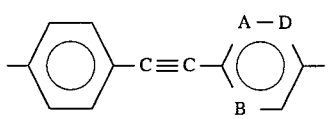

in which A, B and D are each independently CH, CF or N in particular of formula 6a

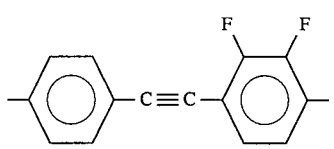

g) A liquid crystalline material wherein the material b) contains at least a mesogenic compound comprising a structure element of formula 7

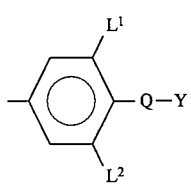

wherein

L$^1$ and L$^2$ are each independently H or F,

Q is —(O)$_t$—(CH$_2$)$_u$—(CF$_2$)$_v$—(CFH)$_x$ t being 0 or 1 being an integer between 0 and 8 v being an integer between 0 and 9 x being an integer between 0 and 8 with the proviso that the sum of v and x is at least 1, or a single bond, and Y is F or Cl.

The invention relates furthermore to a display cell comprising two opposite plates which are transparent to light as the substrate, which plates are provided with an electrode of a material which is transparent to fight on the sides facing each other, said electrode carrying an orientation layer and a sealing material being provided between the ends of the plates, a liquid crystalline material being introduced in the space between the plates and the sealing material, wherein the liquid crystalline material is composed of at least two different liquid crystalline materials, as indicated in claims 1–15.

The mesogenic compounds comprising a structure element selected from the formulae 1 to 5 are known or can be prepared analogously to known procedures, for example:

1) L$^1$ and L$^2$=F: GB 22 16 253;
2) U.S. Pat. No. 4,985,583;
3) U.S. Pat No. 4,783,280;
4) WO 88/08019;
5) WO 92/09576.

The compounds with a structure element of formula 6 are also known, for example, from WO 88/07514.

The compounds with a structure element of formula 7 are also known, for example, from WO 91/03450.

The invention relates furthermore to novel alkylthiobiphenyls of the formula Ia1

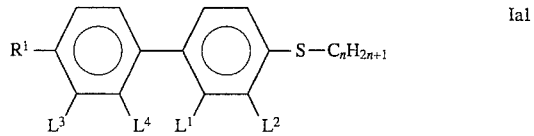

Ia1 wherein R$^1$ and L$^1$ to L$^4$ are as defined in claim 5 and n is 1 to 7, wherein L$^3$=L$^4$=F, L$^1$=L$^2$=H and R$^1$ is a straight-chain alkoxy group of up to 12 C atoms, in particular having n=1, and to novel alkylthiobiphenyls of the formula Ia2

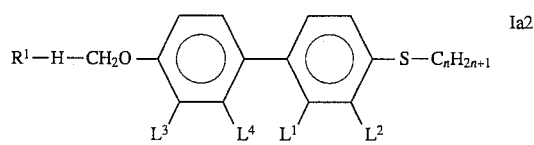

Ia2 wherein R$^1$ and L$^4$ to L$^4$ are each H or F n is 1 to 7.

The acrylates of formula IIA1

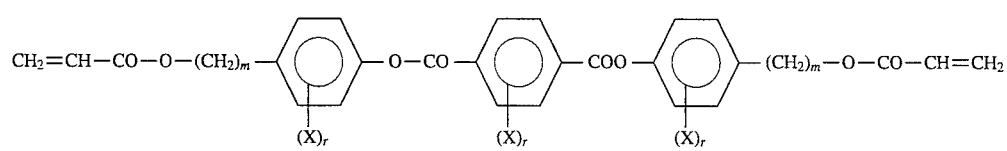

IIA1 are preferred, in particular wherein r is 0 and m is 2 (formula IIA 1).

Formula H covers reactive liquid crystalline compounds with 3 rings of formulae II1–II20

| | |
|---|---|
| R$^1$—P—X—Phe'—Z—Phe"—Phe"—R$^2$ | II1 |
| R$^1$—P—X—Phe'—Z—Pyd—Phe"—R$^2$ | II2 |
| R$^1$—P—X—Phe'—Z—Pyr—Phe"—R$^2$ | II3 |
| R$^1$—P—X—Phe'—Z—Phe"—Pyd—R$^2$ | II4 |
| R$^1$—P—X—Phe'—Z—Phe"—Pyr—R$^2$ | II5 |
| R$^1$—P—X—Phe'—Z—Phe "—CH$_2$CH$_2$—Phe"—R$^2$ | II6 |
| R$^1$—P—X—Phe'—Z—Pyd—CH$_2$CH$_2$—Phe"—R$^2$ | II7 |
| R$^1$—P—X—Phe'—Z—Pyr—CH$_2$CH$_2$—Phe"—R$^2$ | II8 |
| R$^1$—P—X—Phe'—Z—Phe"—CH$_2$CH$_2$—Pyd—R$^2$ | II9 |
| R$^1$—P—X—Phe'—Z—Phe"—CH$_2$CH$_2$—Pyr—R$^2$ | II10 |
| R$^1$—P—X—Nap'—Z—Phe"—Phe"—R$^2$ | II11 |
| R$^1$—P—X—Nap'—Z—Pyd—Phe"—R$^2$ | II12 |
| R$^1$—P—X—Nap'—Z—Pyr—Phe"—R$^2$ | II13 |
| R$^1$—P—X—Nap'—Z—Phe"—Pyd—R$^2$ | II14 |
| R$^1$—P—X—Nap'—Z—Phe"—Pyr—R$^2$ | II15 |
| R$^1$—P—X—Nap'—Z—Phe"—CH$_2$CH$_2$—Phe"—R$^2$ | II16 |
| R$^1$—P—X—Nap'—Z—Pyd—CH$_2$CH$_2$—Phe"—R$^2$ | II17 |
| R$^1$—P—X—Nap'—Z—Pyr—CH$_2$CH$_2$—Phe"—R$^2$ | II18 |
| R$^1$—P—X—Nap'—Z—Phe"—CH$_2$CH$_2$—Pyd—R$^2$ | II19 |
| R$^1$—P—X—Nap'—Z—Phe"—CH$_2$CH$_2$—Pyr—R$^2$ | II20 |

Wherein R$^1$, R$^2$, P, X and Z have the meaning given, Pyd denotes pyrimidine-2,5-diyl and Pyr denotes pyridine-2,5-diyl.

In the compounds of formulae II1–II10, Phe' denotes a 1,4-phenylene group

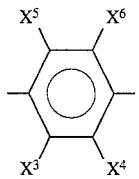

wherein X$^3$–X$^6$ denote independently from each other H or halogen, preferably fluorine or chlorine.

In the compounds of formulae H1–II20, Phe" is a 1,4-phenylene group, which is unsubstituted or mono- or polysubstituted by CN or halogen, and in formulae II15–II20, Nap' is a naphtaline-2,6-diyl group

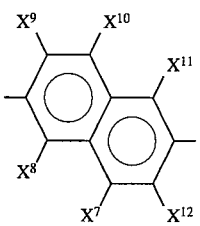

which is unsustbituted or wherein up to 4 of $X^7$–$X^{12}$ are independently from each other halogen while the other denote H.

The compounds of formulae II1–II24 are preferred. Especially preferred are the compounds of fromulae III1–III3, III6–II10,II13–II15, II18–II20, and, in particular the compounds of formulae II1, II8, II15 and H20.

In the compounds of formulae II1–II24 $R^1$ is $CH_2{=}CW{-}COO{-}$,
$CH_2{=}CH{-}$,

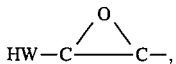

HWN—, HS—$CH_2$—$(CH_2)_m$—COO— with W being H, Cl or alkyl with 1–5 C atoms and m being 1–7.

Preferably, $R^1$ is a vinyl group, an acrylate group, an amino group or a mercapto group, and especially prefered are the following meanings of $R^1$:

| | |
|---|---|
| $CH_2{=}CH{-}COO{-}$ | $R^1$-1 |
| $CH_2{=}\underset{CH_3}{C}{-}COO{-}$ | $R^1$-2 |
| $CH_2{=}\underset{Cl}{C}{-}COO{-}$ | $R^1$-3 |
| $CH_2{=}CH{-}$ | $R^1$-4 |
| $H_2N{-}$ | $R^1$-5 |
| $H(alkyl)N{-}$ | $R^1$-6 |
| $HS{-}CH_2{-}(CH_2)_m{-}COO{-}$ | $R^1$-7 | with alkyl denoting $C_1$–$C_3$-alkyl and m being 1–5.

In the compounds of formulae II1–II20, the spacer-type group P is akylene with up to 24 C atoms, it is also being possible for one or more non adjacent $CH_2$ groups to be replaced by O.

In case P is alkylene, P may be straight-chain or branched. P especially preferred is ethylene, propylene, butylene, 1-methyl-propylene, 2-methylpropylene, pentylene, 1-methyl-butylene, 2-methyl-butylene, hexylene, 2-ethyl-butylene, 1,3-dimethyl-butylene, hephylene, 1-methylhexylene, 2-methylhexylene, 3-methylhexylene, 4-methylhexylene, 5-methylhexylene, 6-methylhexylene, octylene, 3-ethyl-hexylene, nonylene, 1-methyloctylene, 2-methyloctylene, 7-methyloctylene, decylene, undecylene, dodecylene, 2-methylundecylene, 2,7,5-trimethyl-nonylene or 3-propyl-nonylene.

In case P is mono- or polyoxaalkylene, P may be straight-chain or branched. In particular, P is 1-oxa-ethylene, 1-oxa-propylene, 2-oxapropylene, 1-oxabutylene, 2-oxabutylene, 1,3-dioxabutylene, 1-oxa-pentylene, 2-oxapentylene, 3-oxypentylene, 2-oxa-3-methyl-butylene, 1-oxahexylene, 2-oxahexylene, 3-oxa-hexylene, 1,3-dioxa-hexylene, 1,4-dioxyhexylene, 1,5-dioxa-hexylene, 1-oxy-heptylene, 2-oxaheptylene, 1,3-dioxaheptylene, 1,4-dioxa-heptylene, 1,5-dioxa-heptylene, 1,6-dioxa-heptylene, 1,3,5-trioxaheptylene, 1-oxa-octylene, 2-oxa-octylene, 3-oxa-octylene, 4-oxa-octylene, 1,3-d-ioxaoctylene, 1,4-dioxa-nonylene, 1,4-dioxa-decylene, 1,4-dioxa-undecylene and 1,3,5-trioxadodecylene.

X is —O—, —S—, —COO—, —OCO— or a single bond and in particular —O—, —COO—, —OCC— or a single bond. In case X is —O—, —S— or —OCO—, the adjacent CH2-group of Q is not replaced by —O—.

Z is —COO—, —OCO—, —$CH_2CH_2$— or a single bond. In the compounds of formulae II1–II7 and II15–II19, Z preferably is —COO—, —OCO—, —$CH_2CH_2$— or a single bond and, in particular, —COO—, —OCO— or a single bond. In the compounds of formulae II8–II14 and II20–II24, Z preferably is —$CH_2CH_2$— or a single bond.

$R^2$ can be an alkyl radical with up to 15 C atoms which is unsubstituted, monoor polysubstituted by halogen, it also being possible for one or more $CH_2$ groups in these radicals to be replaced, in each case independently from one another, by —O—, —S—, —CO—, —OCO—, —COO— or —O—COO— in such a manner that oxygen atoms are not linked directly to one another.

If $R^2$ is an alkyl radical or alkoxy radical, it may be straight-chain or branched. Preferably, it is straight-chain, has 2, 3, 4, 5, 6, 7 or 8 carbon atoms and accordingly os preferably ethyl, propyl, butyl, pentyl, hexyl, heptyl, octyl, ethoxy, propoxy, butoxy, pentoxy, hexoxy, heptoxy or octoxy, and furthermore methyl, nonyl, decyl, undecyl, tridecyl, tetradecyl, pentadecyl, methoxy, nonoxy, decoxy, undecoxy, dodecoxy, tridecoxy or tetradecoxy.

If $R^2$ is oxaalkyl, it is preferably straight-chain 2-oxapropyl (=methoxymethyl), 2-oxabutyl (= ethoxymethyl) or 3-oxabutyl (= 2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7-or 8-oxanonyl, 2-, 3-, 4-, 5-, 6-, 7-, 8-, or 9-oxadecyl.

Preferred branched radicals R2 are isopropyl, 2-butyl (=1-methylpropyl), isobutyl (- 2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa- 3-methylbutyl, 3-oxa-4methylpentyl, 4-methylhexyl, 2-nonyl, 2-decyl, 2-dodecyl, 6-methyloctoxy, 6-methyloctanyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2 cloro-3-methylvaleryloxy, 2-methyl-3oxypentyl, 2-methyl-3-oxahexyl.

$R^2$ can also have one of the meanings given for $R^1$—P—X— above. In case R2 is an—optionally substituted—alkyl radical, R1 preferable is a vinyl or acrylate group while in case $R^2$ is $R^1$—P—X, all meanings given above for $R^1$ are preferred.

Especially preferred is the following smaller group of reactive liquid crystalline compounds according to formula II1:

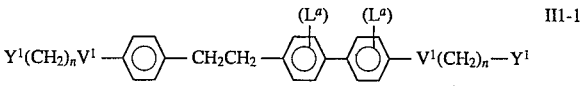

wherein $L^a$ denotes H, F or Cl, preferably H or F, $Y^1$ is $CH_2{=}CW^1COO{-}$, $CH_2{=}CH{-}$ or HS $CH_2$ $(CH_2)_mCOO{-}$ $V^1$ is —O—, —COO—, —OOC—, —S— or a single bond, $W^1$ is H, Cl or $CH_3$,
n is 2–12, and

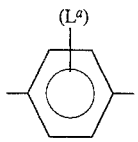

is independently from each other 1,4-phenylene, 2-fluoro-1,4-phenylene, 3-fluoro- 1,4-phenylene, 2,6-difluoro- 1,4-phenylene, 2,3,6-trifluoro 1,4-phenylene, 2-chlor-1,4-phenylene, 3-chloro- 1,4-phenylene or 2,6-dichloro- 1,4-phenylene.

Especially preferred are compounds according to formula II1-1 wherein $Y^1$ is $CH_2$=CHCOO, $V^1$ is O and —

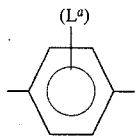

is independently from each other 1,4-phenylene or 2-fluoro- or 3-fluoro-1,4-phenylene. The compounds of this smaller subclass of compounds according to formula III1-1 are characterized by advantageous values of birefringence and by low melting points.

Especially preferred is also the following smaller group of compounds according to formula II8:

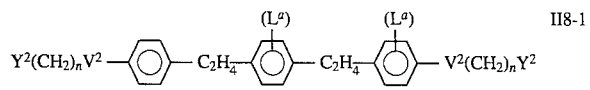

II8-1 wherein
$Y^2$ is $CH_2$=CHCOO—, $CH_2$—C($CH_3$)—COO—, or $CH_2$=CH—,
$V^2$ is —O— or a single bond,
n is 2–12, and

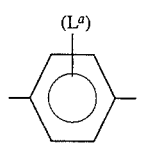

has the meaning indicated above.

Especially preferred are compounds according to formula II8-1 wherein $Y^1$ is $CH_2$=CH—COO— and $V^2$ is —O—. The compounds according to formula II8-1 exhibit especially advantageous melting points.

Especially preferred are further compounds according to the following formula (F)

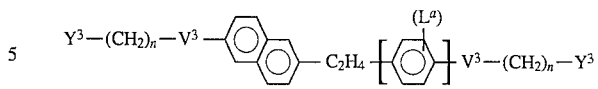

wherein
$Y^3$ is $CH_2$=$CW_3$COO—, $CH_2$=CH— or $HSCH_2(CH_2)_m$—COO—,
$V^3$ is —O—, —COO—, —OOC—, —S— or a single bond,
$W^3$ is H, Cl or $CH_3$,
n is 2–12,
r is 1 or 2, and

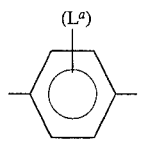

has the meaning indicated above.

Compounds of this type are partially covered by formula II15 (r=2). Particularly preferred are compounds of this type wherein
$Y^3$ is $CH_2$=$CW^3$COO—
n is 3–11 and in particular 4, 5, 6, 7 or 8,
$V^3$ is —O— or a single bond, and
r is 1.

The compounds of this specific subgroup are characterized by advantageous values of the melting point and the birefringence.

Especially preferred is further the following smaller group of reactive liquid cystalline compounds according to the following formula

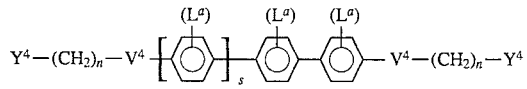

wherein
$Y^4$ is $CH_2$=$CW^4$COO—, $CH_2$=CH— or $HSCH_2(CH_2)_n$COO—,
$V^4$ is —O—, —COO—, —OCO—, —S— or a single bond,
$W^4$ is H, $CH_3$ or Cl,
is 1–12,
is 0, 1 or 2, and

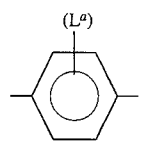

has the meaning indidated. Conpounds of this type are partly covered by formula II1.

Particularly preferred is the following rather small group of compounds:

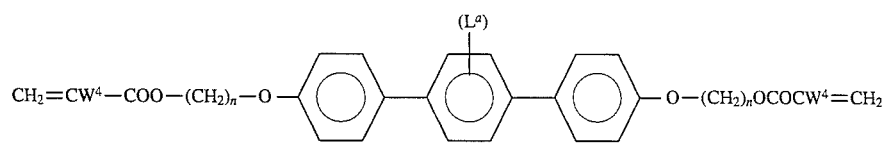

The compounds of this specific subgroup are characterized by advantageous values of the melting point and the birefringence.

Especially preferred is further the following smaller group of reactive liquid crystalline compounds according to the following formula

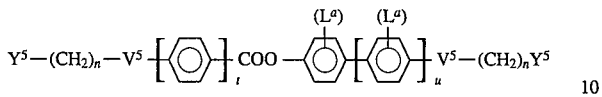

wherein
Y$^5$ is CH$_2$=CW$^5$COO—, CH$_2$=CH— or HSCH$_2$(CH$_2$)$_m$COO,
V$^5$ is —O—, —COO—, —OCO—, —S— or a single bond,
W$^5$ is H, CH$_3$ or Cl,
n is 1–12,
t and u are independently from each other 0, 1 or 2 with the proviso that t and n is 1, 2 or 3,
and

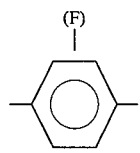

has the meaning indicated.

Compounds of this type are partly covered by formula III. Particularly preferred in the following rather small group of compounds:

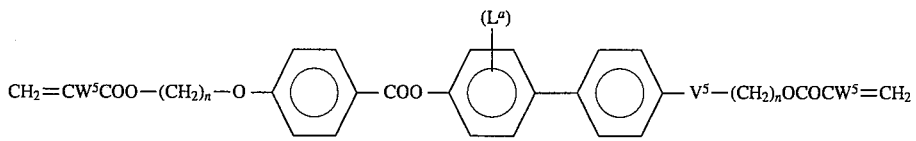

Especially preferred is further the following smaller group of compounds:

CH$_2$=CW$^6$COO—T$^6$—V$^6$—U$^6$—V$^6$—T$^6$—OCO—CW$^6$=CH$_2$ wherein

W$^6$ is H, CH$_3$ or Cl

T$_6$ is (CH$_2$)$_n$ or (CH$_2$)$_v$—(O)$_w$—(CH$_2$)$_z$—$\overset{*}{\underset{}{\text{CH}}}$—$\overset{\text{CH}_3}{|}$ n is 1–12, v is 1–8, w is 0 or 1, z is 0–4, V$^6$ is —O—, —S—, —COO—, —OCO— or a single bond and,
in particular —O— or —S—

U$^6$ is 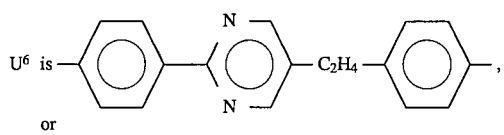

or

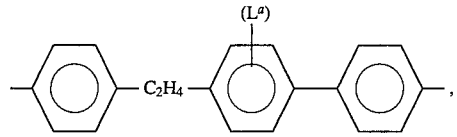

and

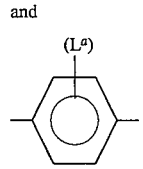

has the meaning indicated.

The compound of this specific subclass are characterized by advantageous values of the melting point and the berefringence. Compounds wherein T$^6$ is

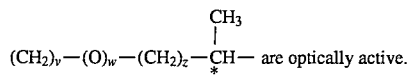 are optically active.

The reactive liquid crystalline compounds according to formula I and, in particular, the preferred compounds according to formula III and according to the preferred subclasses can be prepared by methods which are known per se and which are described, for example, in standard works of organic chemistry such as, for example, Houben-Weyl, Methoden der Organischen Chemie, Thieme-Verlag, Stuttgart. Some specific methods can be taken from the examples.

In the following and in the preceding, all percentages given are percentages by weight. Temperatures are given in degrees Celsius.

The following examples are intended to illustrate the invention without restricting it.

EXAMPLE 1.

The reactive liquid crystalline compounds (1)

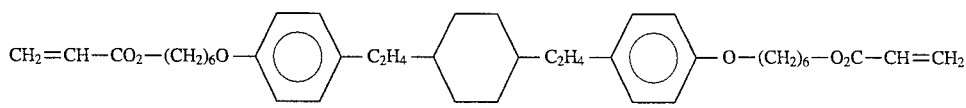

is prepared via the sequence of reaction steps shown in diagram 1. Pd(Ph)₃ tetrakis triphenylphosphine palladium and Δ denotes heating.

In step 6 of diagram 1, 1 mol of the phenylether obtained in step 5 and 1.1 mol of acrylol chloride are dissolved in 1 l of dichlormethane. 1.1 mol of triethylamine are added, and the mixture is stirred for 3 hours at room temperature. Aqueous work-up and volumn chromatography gives (1).

EXAMPLE 2

The reactive liquid crystalline compound (2)

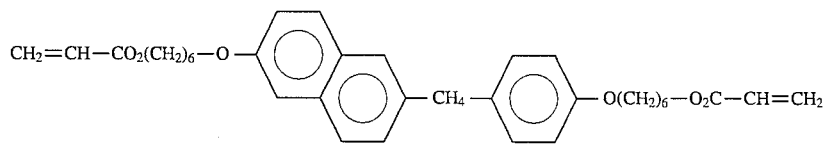

is prepared via the sequence of reaction steps shown in diagram 2. TEA is triethylamine, DCM is dichloromethane and rt is room temperature.

In step 4 of diagram 2, 2.2 mol of triethylamine is added dropwise to a mixture of 1 mol of the alcohol obtained in step 3, and 2.1 mol of acryloyl chlorid in 2 l of dichloromethane. After 24 hours the reaction mixture is washed with water, and volumne chromatography gives (2).

EXAMPLE 3

The reactive liquid crystalline compound (3)

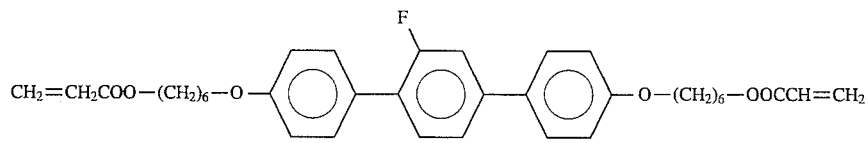

is prepared via the sequence of reaction steps shown in diagram 3. DME is dimethoxyethane.

In step 5 of diagram 3 2.2 mol of triethylamine is added dropwise to a solution of 1 mol of the hydroxyterphenyl obtained in step 4 of diagram 3, and 2.1 mol acryloyl chloride in 2 l dichloromethane. It is stirred for 4 hours at room temperature. Aqueous work-up and column chromatography gives (3).

Analogously are obtained:

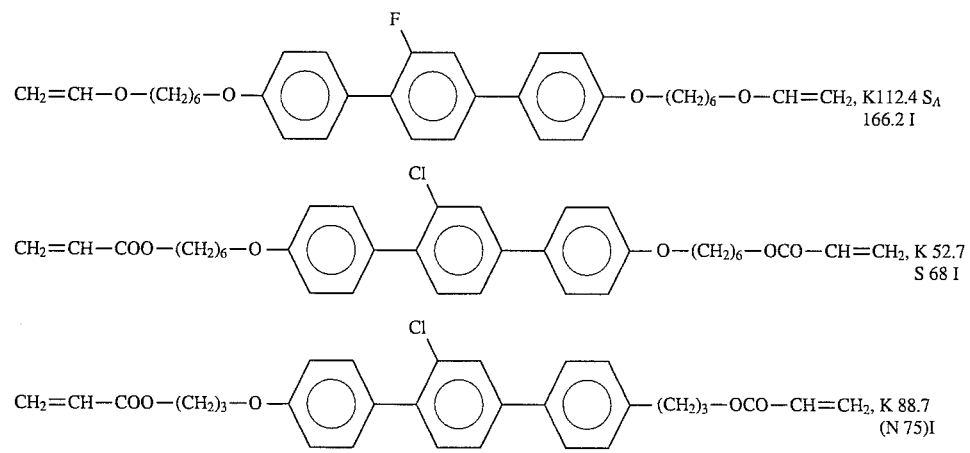

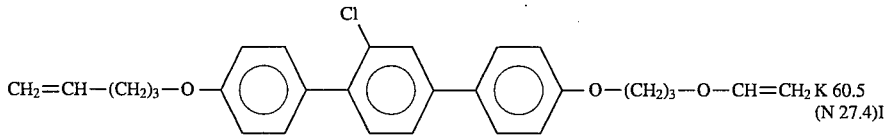

EXAMPLE 4

The reactive liquid crystalline compound (4)

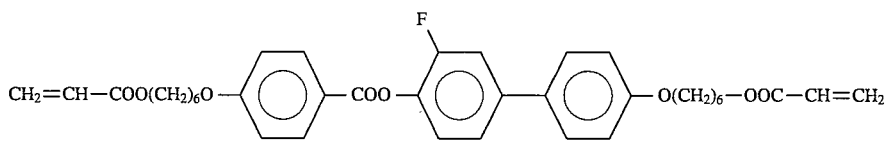

is prepared via the sequence of reaction steps shown in diagram 4.

In step 4 of diagram 4, 2.2 mol triethylamine is added dropwise to a solution of the ester obtained in step 3 of diagram 4, and 2.1 tool acryloyl chloride in 2 1 dichloromethane. The reaction mixture is stirred at room temperature for 4 hours. Aqueous work-up and column chromatography gives (4).

EXAMPLE 5

The reactive liquid crystalline compound (5)

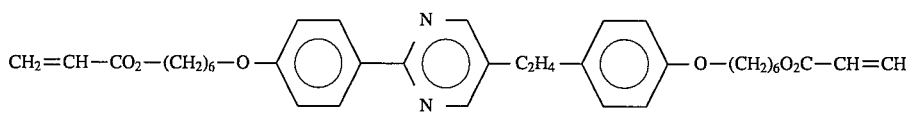

is prepared via the sequence of reaction steps shown in diagram 5.

In step 4, 2.2 mol of triethylamine is added dropwise to a solution of 1 mol of the substituted pyrimidine obtained in step 3 of diagram 5, and 2.1 mol of acryloyl chloride in 2 1 dichloromethane. The reaction mixture is stirred at room temperature for 4 hours. Aqueous work-up and column chromatographic gives (5).

EXAMPLE 6

The reactive liquid crystalline compound (6)

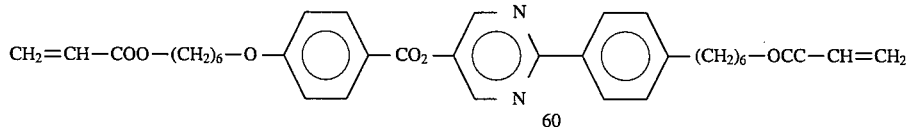

is prepared via the sequence of reaction steps shown in diagram 6.

Buli is buytyllithium and B(one)3 is trimethylborate.

In step 4, 2.2 mol of triethylamine is added dropwise to a solution of 1 mol of the substituted pyrimidine obtained in step 3 of diagram 6, and 2.1 mol of acryloyl chloride in 2 1 dichloromethane, and the reaction mixture is stirred at room temperature for 4 hours. Aqueous work-up and column chromatographic gives (6).

EXAMPLE 7

The reactive liquid crystalline compound (7)

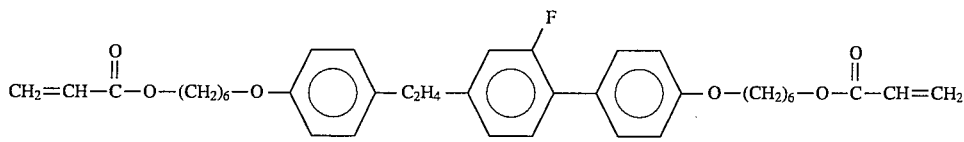

is prepared via the sequence of reaction steps shown in diagram 7.

In step 4, 2.2 mol of triethylamine is added dropwise to a solution of 1 mol of the ethylene linked compound obtained in step 3 of diagram 4, and 2.1 mol of acryloyl chloride in 2 1 dichloromethane. The reaction mixture is stirred for 4 hours at room temperature. Aqueous work-up and column chromatography gives (7).

EXAMPLE 8

The optically active reactive liquid crystalline compound (8)

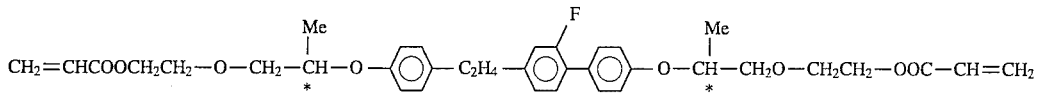

(7)

is prepared via the sequence of reaction steps shown in diagram 8.

THF is tetrahydrofurane and Br—CH$_2$—CH$_2$—THP is 2-bromo-1-(tetrahydropyranyl)ethanol which can be prepared according to the method described in A. Hoppmann, Tetrahedron, 34 (1978), 1723.

In step 5, 2.2 mol of triethylamine is added dropwise to a solution of 1 mol of the diol obtained in step 4 of diagram 8, and 2.1 mol of acryloyl chloride in 2 l dichloromethane. The reaction mixture is stirred at room temperature for 4 hours. Aqueous work-up and column chromatography gives (8).

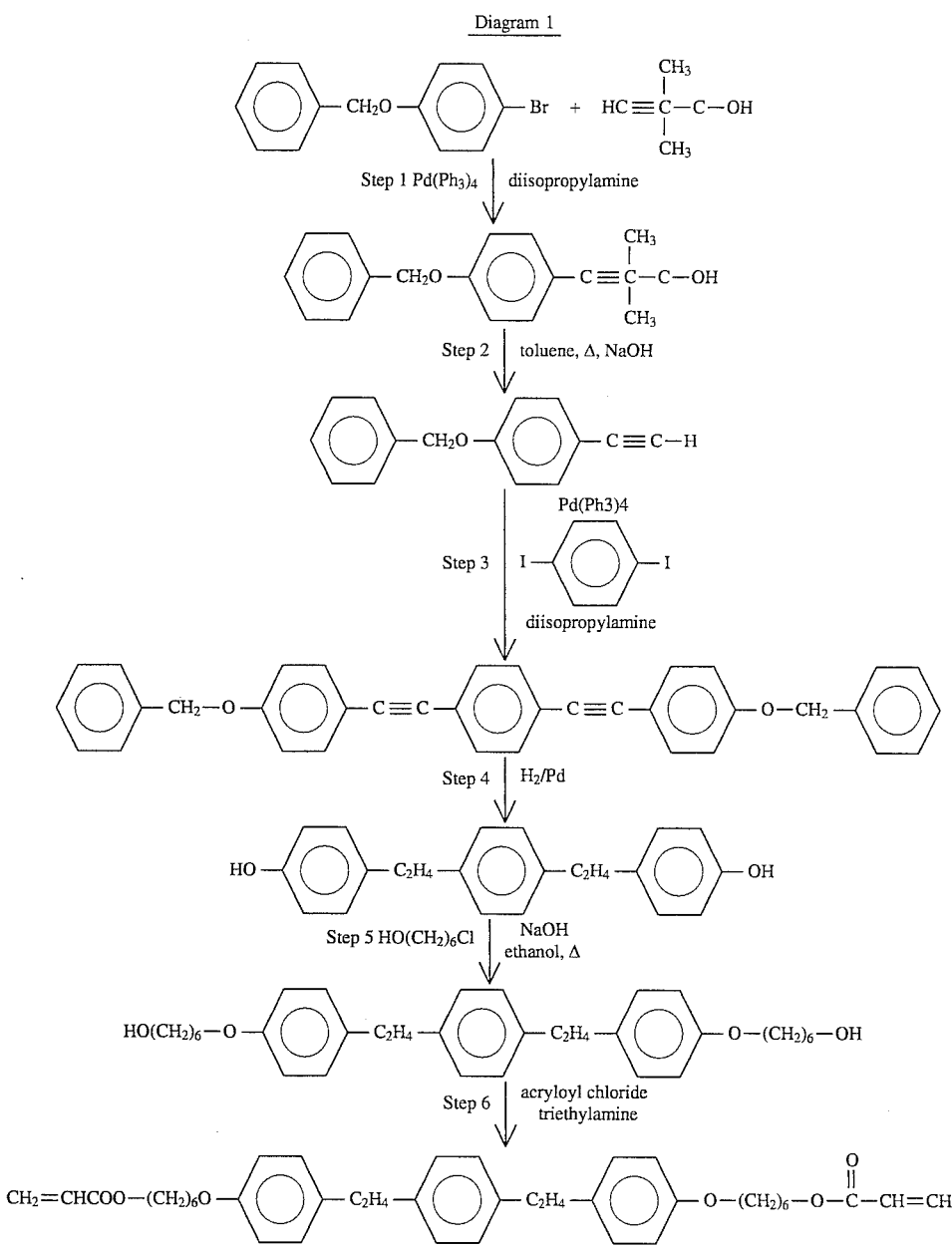

Diagram 1

Diagram 2
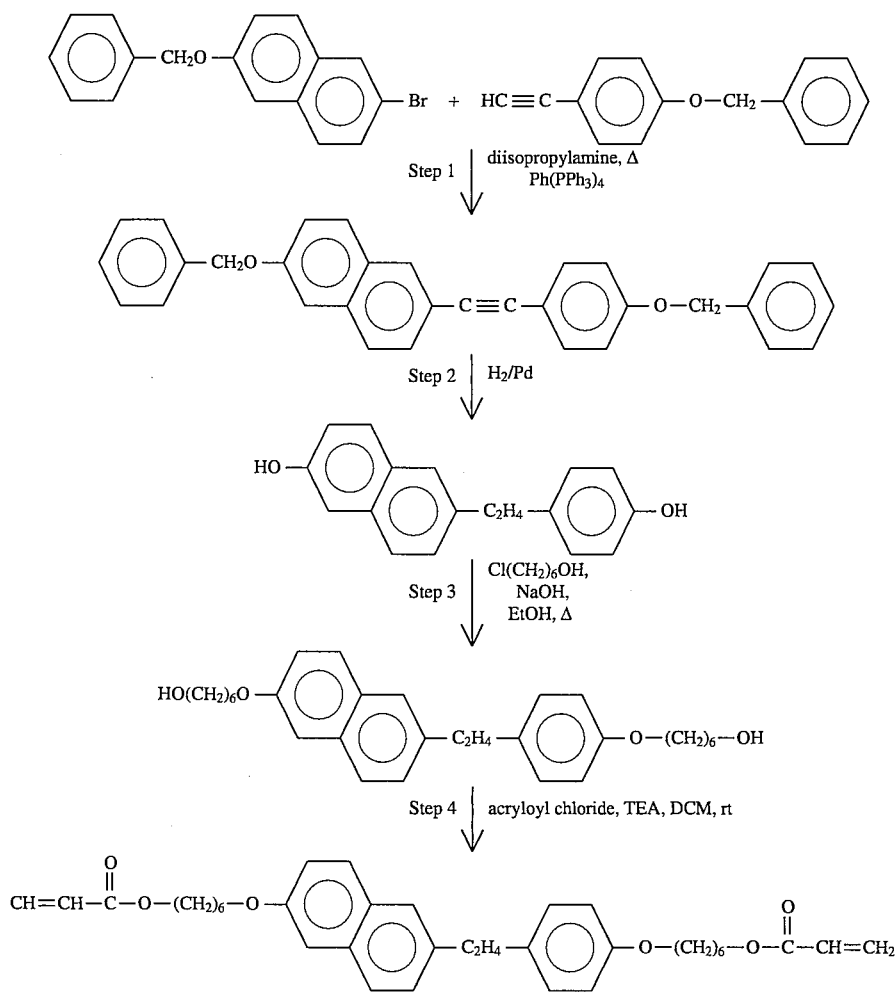
Diagram 3
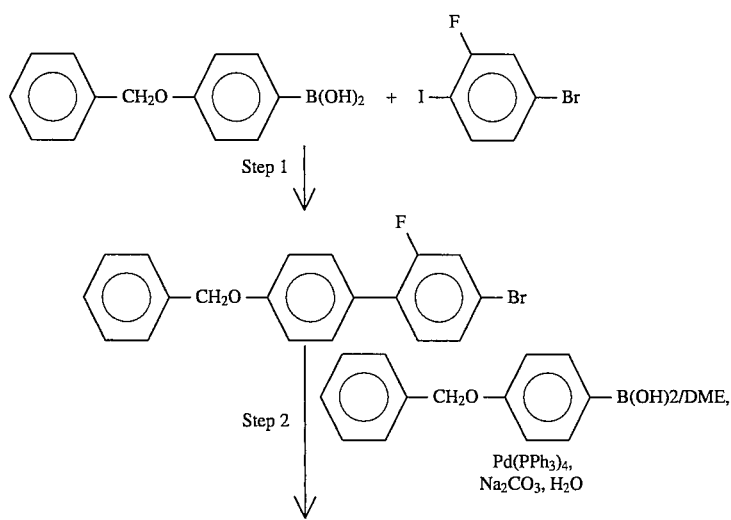

-continued
Diagram 3
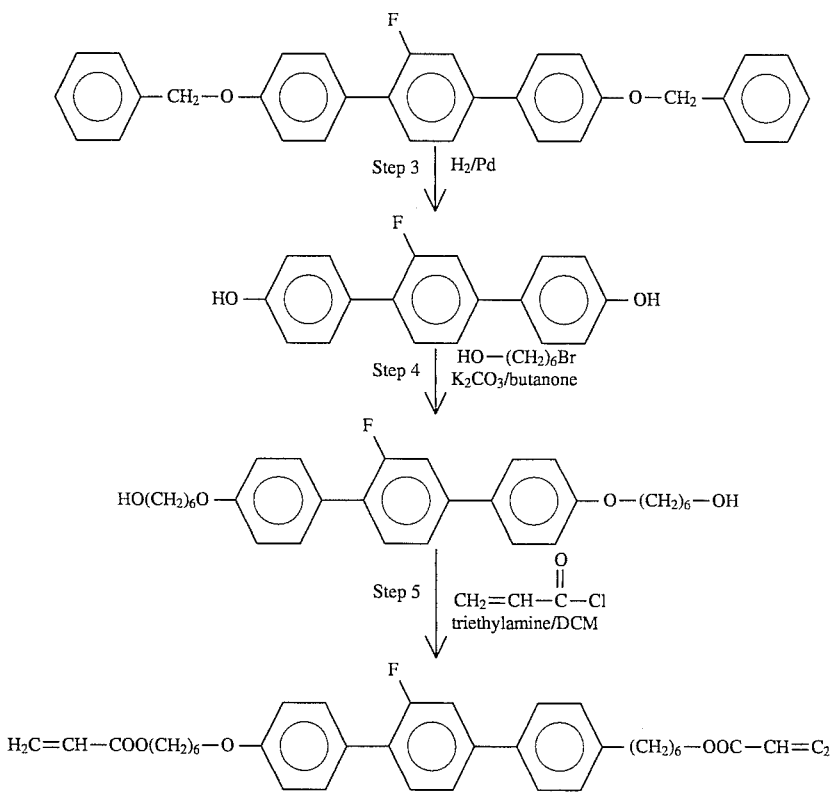
Diagram 4
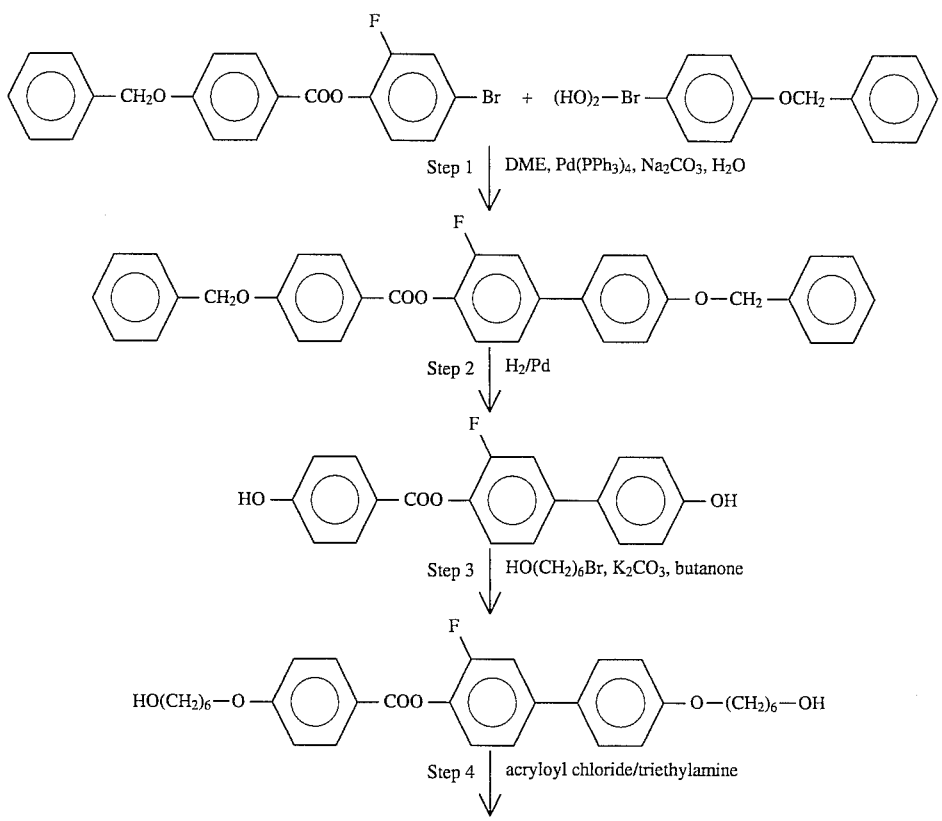

-continued
Diagram 4
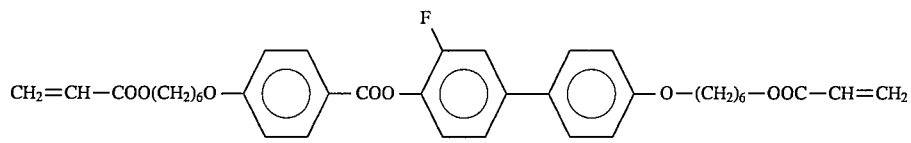
Diagram 5
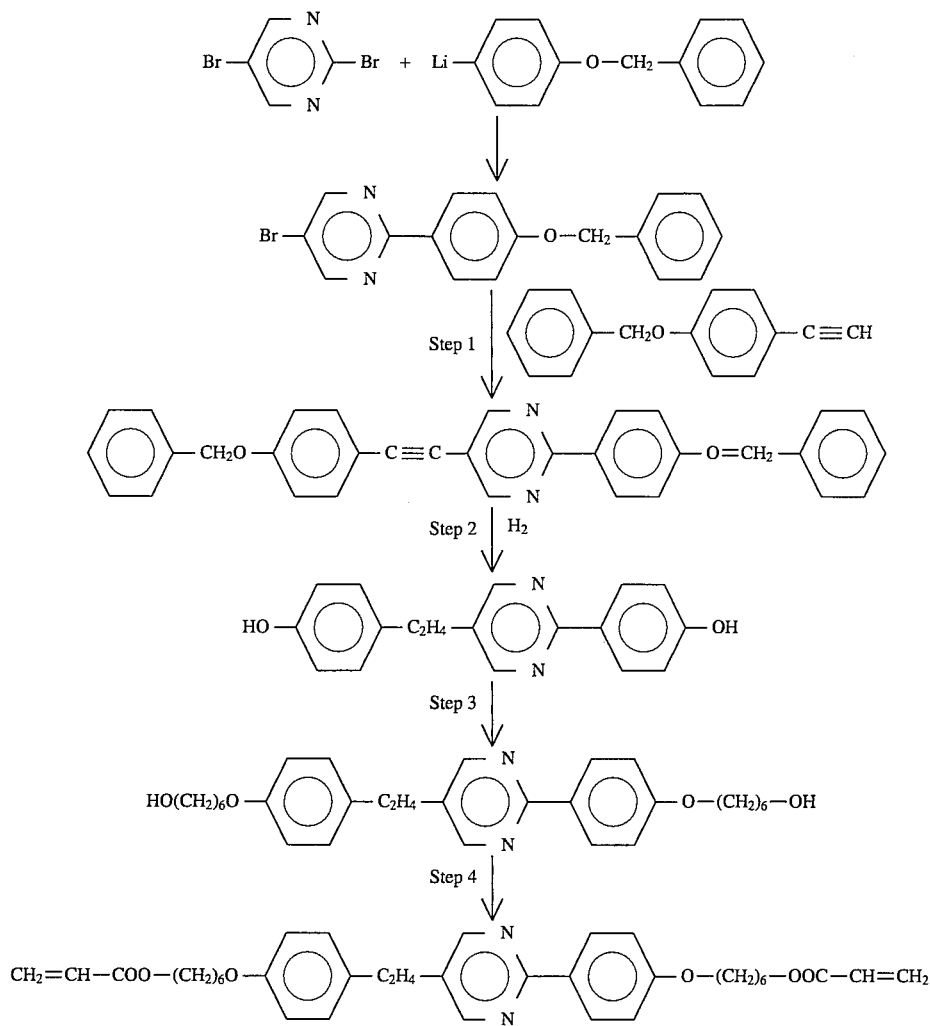
Diagram 6
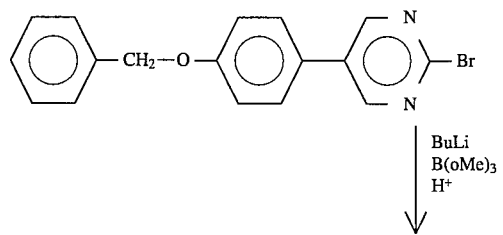

-continued
Diagram 6
Step 1
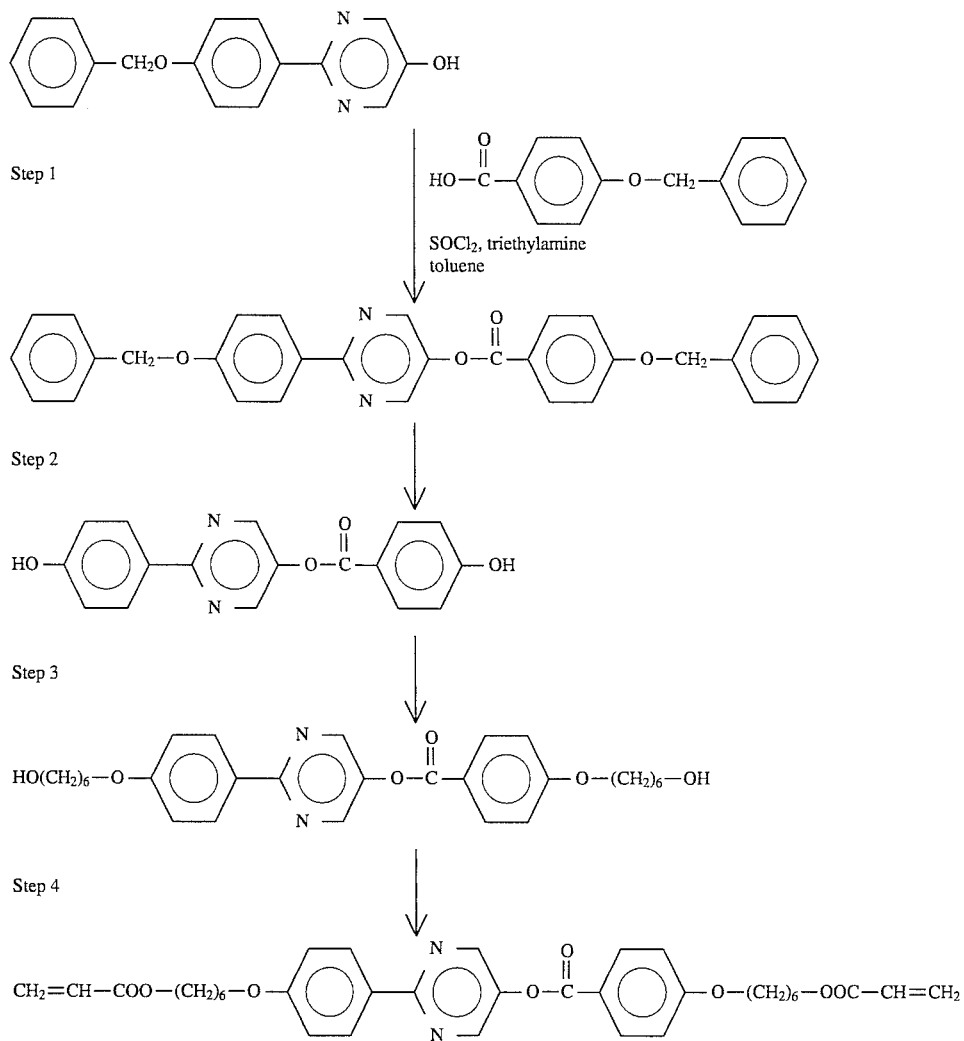
Diagram 7
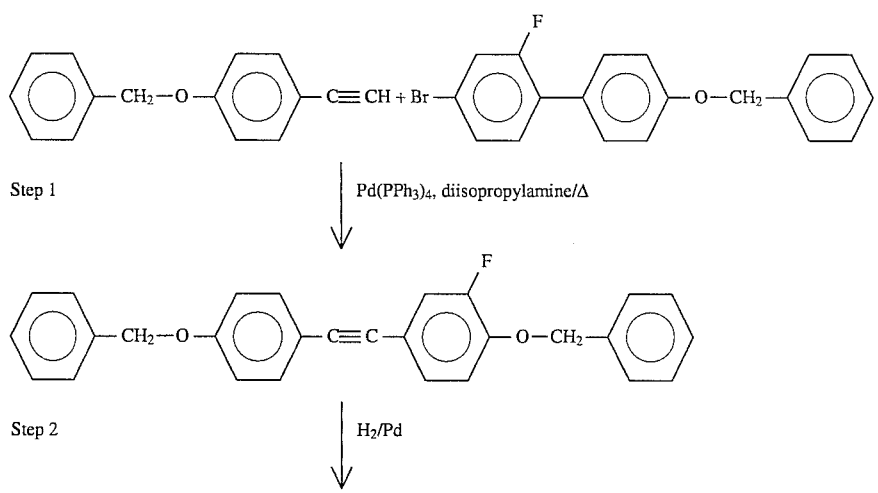

-continued
Diagram 7
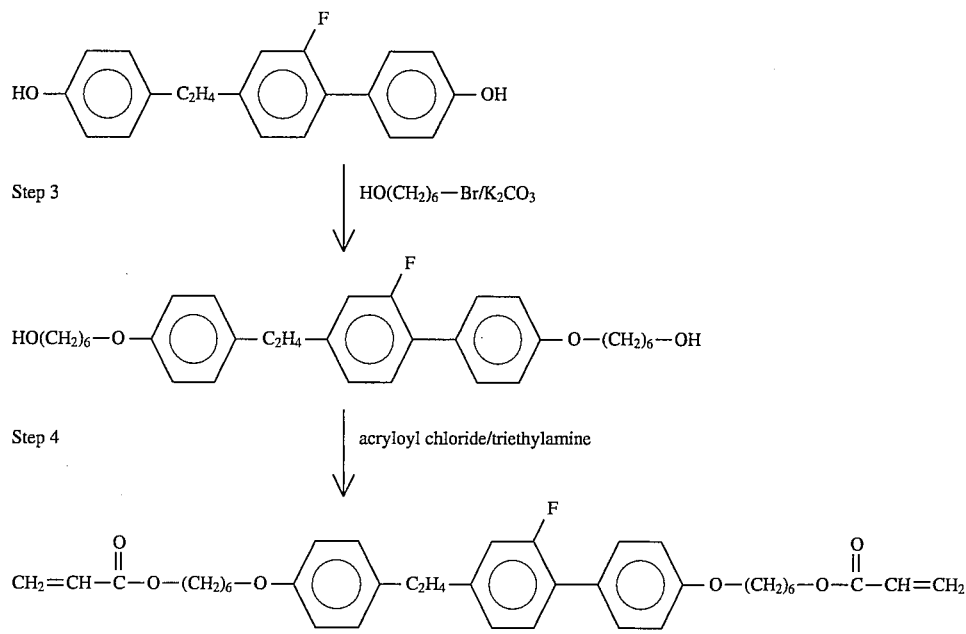
Diagram 8
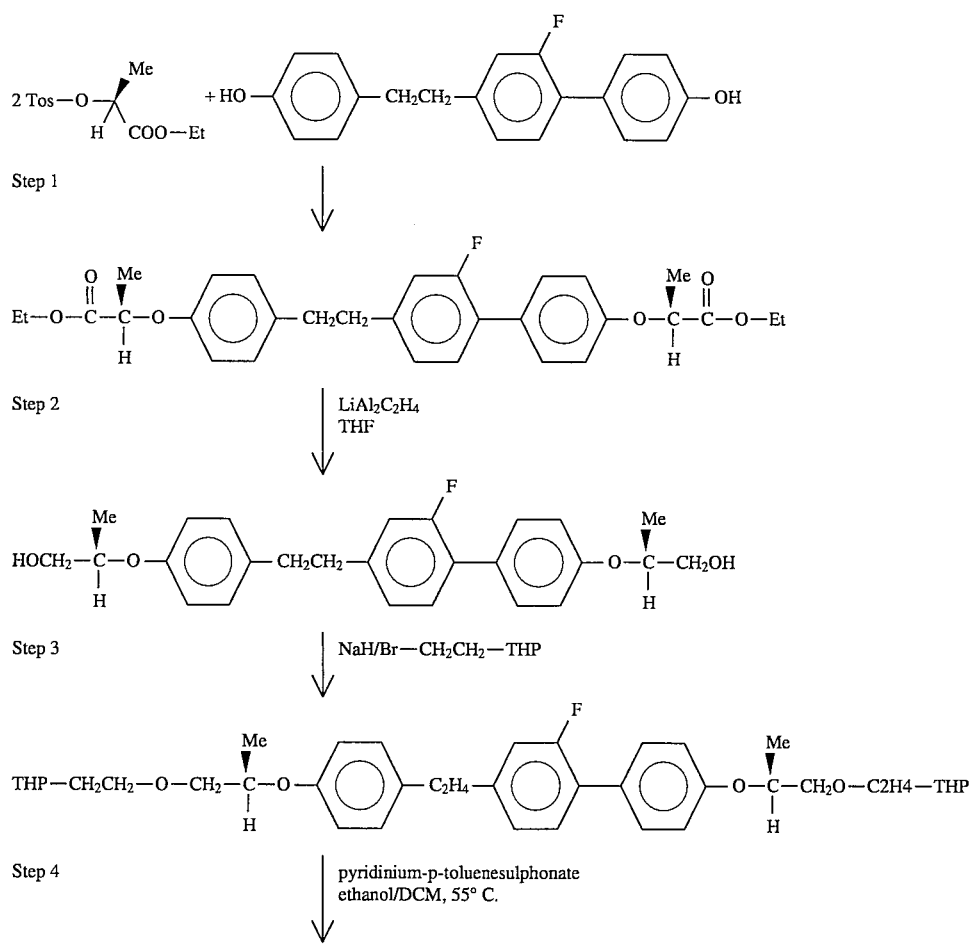

-continued
Diagram 8
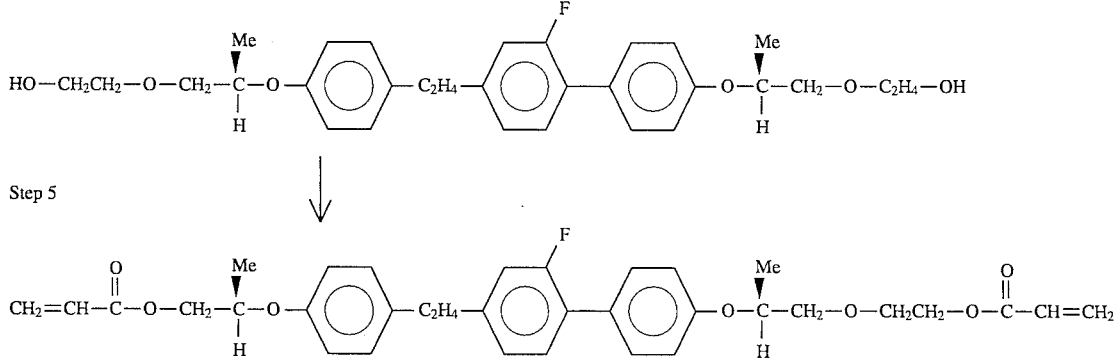
Step 5
The novel alkyl this biphenyls of formulae Ia1 and Ia2 are for example prepared according to the following diagrams:
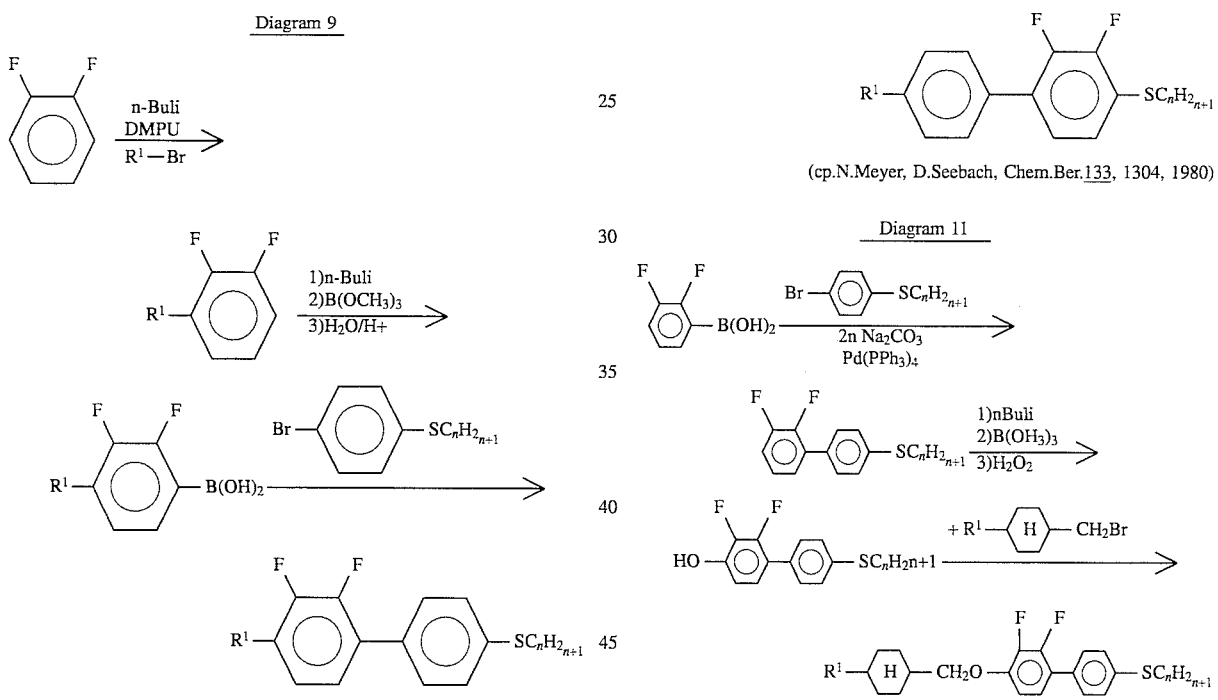
Diagram 10
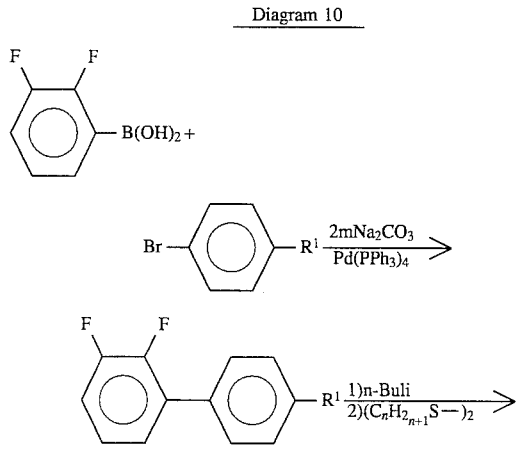
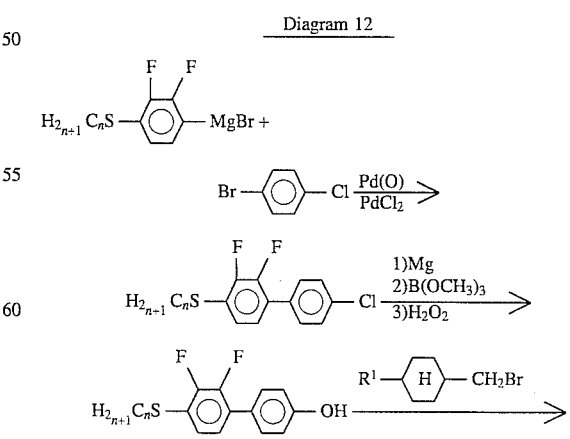

-continued
Diagram 12

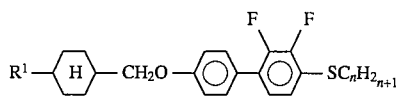

The liquid-crystalline mixtures according to the invention preferably consist of 2 to 25, preferably 3 to 15, components, including at least one compound of the formula I. The other constituents are preferably selected from the nematic or nematogenic substances, in particular the known substances, from the classes of the azoxybenzenes, benzylideneanilines, biphenyls, terphenyls, phenyl or cylcohexyl benzoates, phenyl or cylcohexyl cyclohexanecaboxylates, phenylcyclohexanes, cyclohexylbi-phenyls, cyclohexylcyclohexanes, cyclohexylnaphthalenes, 1,4-biscyclohecylbenzenes, 4,4'-bis-cyclohexylbiphenyls, phenylpydmidines, cyclohexylpyrimidines, phenyldioxanes, cyclohexyldioxanes, phenyl- or cyclohexyl-1,3-dithianes, 1,2-bis-cylcohexylethanes, 1,2-bis-phenylethanes, 1-phenyl-2-cylcohexylethanes, optionally halogenated stilbenes, benzyl phenyl ethers, tolanes and substituted cinnamic acids.

The most important compounds which the suitable for use as constituents of such liquid-crystalline phases can be characterized by the formula III

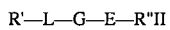

in which L and E are each a carbocyclic or heterocyclic ring system from the group formed by 1,4-disubstituted bezene and cyclohexane rings, 4,4-disubstituted biphenyl, phenylcylcohexane and cyclohexylcyclohexane systems, 2,5-disubstituted pyrimidine and 1,3-dioxane rings, 2,6-disubstituted naphthalene, di- and tetrahydrogenquinazoline.

G is —CH=CH—, —CH≡CY—, —C=C—, —CH$_2$CH$_2$—, —CO—O—, —CH$_2$'O—, —CO—S—, —CH$_2$—S—, —CHN or a C C single bond. Y is halogen, preferably chlorine, or —CN and R' and R" are alkyl, alkoxy, alkanoyloxy or alkoxycarbonyloxy having up to 18, preferably up to 8 carbon atoms, or one of these radicals is also CN, NC, NO$_2$, CF$_3$, Cl or Br.

In most of these compounds R' and R" are different from each other, one of these radicals usually being an alkyl or alkoxy group. However, other variants of the proposed substituents are likewise customary. Many such substances or even mixtures thereof are commercially available. All these substances can be prepared by methods described in the literature.

The mixture according to the invention contain about 0.1 to 99, preferably 10 to 95 % of one or more compounds of the formula I. Preference is further given to dielectrics according to the invention containing 0.1 to 40, preferably 0.5 to 30 % of one or more compounds of the formula I.

The preparation of the mixtures according to the invention is effected in conventional manner. In general the components are dissolved in one another, preferably at elevated temperature.

By means of suitable additives the liquid-crystalline mixtures according to the invention can be modified in such a way that they can be used in all hitherto disclosed types of liquid crystal display elements.

Such additives are known to the skilled worker and are described in detail in the literature. It is possible to add for example dichroic dyes for preparing colored guest-host systems or substances for changing the dielectric anisotropy;

the viscosity and/or the orientation of the nematic phases. Such substances are described for example in German Offenlegungsschriften 2.209.127, 2.240.864, 2.321.632, 2.338.281, 2.450.088, 2.637.430, 2.853.728 and 2.902.177.

Preferred components of the LC mixtures other than those of the formula I are conpounds of the formula III wherein L and E are one, carbocyclic ring systems and wherein one 1,4-phenylene group may also be laterally fluorinated, G is a direct bond or —CH$_2$CH$_2$ and R' and R" are both independently alkyl or alkoxy groups.

Especially preferred are those of the following formulae:

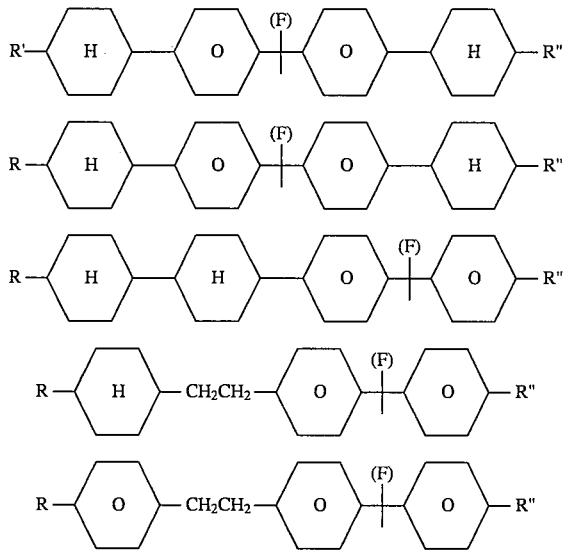

The mixtures may also include compounds of the formula II wherein G is —CO—O— or —C≡C— but they are not desireable because of stability problems and accordingly are used not as base materials or preferably avoided at all.

The displays according to the invention exhibit opposite plates which are transparent to light and which will hereinafter be termed substrates and which comprise electrodes on the opposing sides, said electrodes being manufactured from, for example, In$_2$O$_3$— SnO$_2$. On the electrode there is provided an orientation layer of, for example, a polyamide or silane or a chromium complex, by means of which the liquid crystalline material 6 according to the invention can be homoetropic aligned between the electrodes. Alternatively, a magnetic or a electric field may be applied while the material cures, in order to achieve a homoetropic alignment. The cell is manufactured by arranging the substrates thus formed and provided with electrodes closing the apertures by, for example, a ting-shaped member and filling the space between the substrates and the ting with the liquid crystalline material according to the invention. In practice, a bonding layer of an epoxy compound can be used instead of the ting shown.

The liquid crystalline material can be capillary filled between two substrates which are provided with electrode layers, and is then subsequently cured, for example, by irradiation with UV light, preferably in the presence of a photoinitiator, for example, an Igracure®. Another technique comprises coating of the LC material on a substrate with subsequent curing. The film may be peeled of and arranged between 2 substrates provided with electrode layers. It is also possible that the substrate onto which the LC material is applied exhibits an electrode layer so that the electrooptical system can be obtained by applying a second electrode layer and, optionally, a second substrate onto the coated and cured film.

The above-mentioned scattering properties of the gel can of course be used in many other opto-electronic devices, such as shutters.

The invention will be explained in more detail by means of the following examples of the preparation of a liquid crystalline material according to the invention.

The electrooptical system according to the invention can be operated reflectively or transmissively so that at least one electrode and, if present, the associated substrate are transparent. Both systems customarily contain no polarizers, as a result of which a distinctly higher light transmission results and is a considerable technological simplification in the production of these systems compared with conventional liquid crystal systems such as, for example, TN or STN cells.

When no voltage is applied to the cell, light incident on said cell is not scattered and the cell is transparent. By applying a voltage, the gel present in the cell is subjected to an electric field. Applying a field causes the liquid crystalline material b) to lie orthogonal to the field, but the material a) produces many small cells, each of these cells behaves independently and therefore the nematic director in each cell is different to its neighbors, thus light passing through the cell experiences many changes in refractive index in a micron or sub-micron and thus becomes scattered.

To enhance the light scattering liquid crystalline materials with high An preferably ≧0.15, are preferred.

The rise time increases according as the cell thickness increases, but the decay time remains constant. The decay time decreases rapidly according as the content of network molecules increases. Consequently, it is not the thickness of the cell that counts but the average distance between the network molecules. This explains the short decay times in comparison with the decay times (a few hundred milliseconds) in normal nematic cells. More particularly, decay times of less than one millisecond can be obtained.

Without further elaboration, it is believed that one skilled in the art can, using the preceding description, utilize the present invention to its fullest extent. The preferred specific embodiments are, therefore, to construed as merely illustrative, and not limitative of the disclosure in any way whatsoever.

The entire disclosures of all applications, patent, and publications cited above and below, and of corresponding application GB 9220750.5 filed Oct. 2, 1992, are hereby incorporated by reference.

Above and below, percentages are percent by weight. Temperatures are given in degrees Celsius. Mp. denotes melting point, Bp.=clear point. Furthermore, C=crystalline stage, N=nematic phase, S=smectic phase and I=isotropic phase. The data between these symbols represent the transition temperatures. An denotes optical anisotropy (589 nm, 20° C.), and the viscosity (mm²/sec) was determined at 20° C.

"Customary work-up" means that water is added if necessary, the mixture is extracted with methylene chloride, diethyl ether or toluene, the organic phase is separated off, dried and evaporated, the product is purified by distillation under reduced pressure or crystallization and/or chromatography. The following abbreviation are used:

| DAST | Diethylaminosulfur trifluoride |
| DCC | Dicyclohexylcarbodiimide |
| DDQ | Dichlorodicyanobenzoquinone |
| DIBALH | Diisobutylaluminum hydride |
| KOT | Potassium tertiary-butoxide |
| THF | Tetrahydrofuran |
| pTSOH | p-Toluenesulfonic acid |
| TMEDA | Tetramethylethylenediamine |

EXAMPLE 9

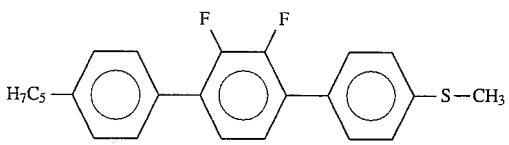

Step 9.1

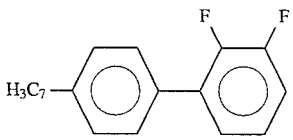

A solution of 0.05 tool 4-n-propyl-1-brombenzene in ethanol is added dropwise to a stirred mixture of 40 ml 0.05 mol 2,3-difluorophenyl boronic acid and 1 g tetrakis(triphenylphosphine)palladium(0) in 100 ml benzene and 50 ml 2 M $Na_2CO_3$ at room temperature under dry $N_2$. The stirred mixture is heated under reflux until glc analysis confirmed absence of starting materials. The product is extracted with ether and dried ($MgSO_4$). The solvent is removed and the residue is purified by column chromatography and crystallization.

Step 9.2

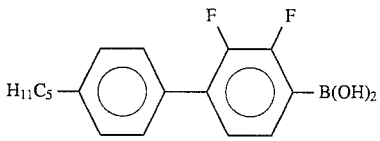

A solution of n-butyllithium (10.0M in hexene) is added dropwise to a stirred cooled solution (−78° C.) of 0.5 tool 4'-n-propyl-2,3-difluorobiphenyl in 100 ml dry THF under dry $N_2$. The stirred mixture is maintained under these conditions for 2.5 h and then a cooled solution of tri-isopropylborate in dry THF is allowed to warm to room temperature overnight and then stirred for 1 h at room temperature with 10% HCl. The product is extracted and combined etheral extracts are washed with water and dried. The solvent is removed in vacuo.

Step 9.3

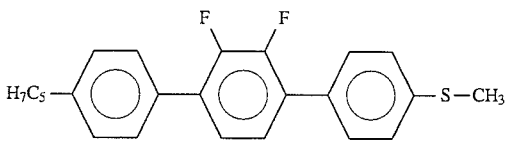

5.0 g of 4-pentyl-2',3'-difluoro-4'-biphenyl boronic acid, 3.5 g of 4-bromothioanisole, 30 ml of 1,2 dimethoxyethane, 20 ml of 2M aqueous sodium carbonate solution and 0.2 g of tetrakis triphenylphosphine palladium(O) were refluxed for 24 hrs under $N_2$.

The crude product was extracted out of the mixture with dichloromethane and purified by column chromatography and recrystallisation. K122 N149 I, Δn 0.30.

The following compounds are prepared analogously:

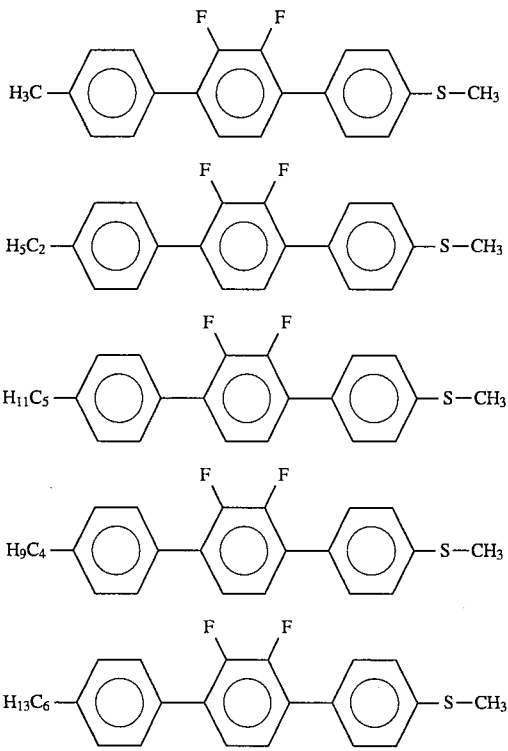

EXAMPLE 10

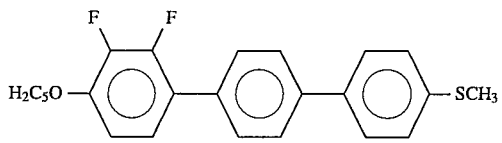

Step 10.1

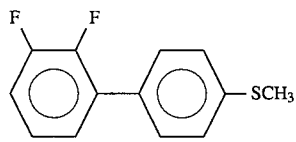

4-thiomethyl phenyl boronic acid (29 g), 4-heptyl-2,3-fluoroiodobenzene (52 g), 1,2-dimethoxyethane (300 ml), 2M $Na_2CO_3$ (aq.) (200 ml) and tetrakistriphenylphosphine palladium(O) (0.5 g) were heated under reflux for 24 hours. The crude product was purified by recrystallization and column chromatography.

Step 10.2

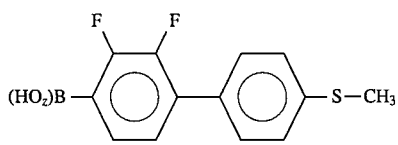

4'-Thiomethyl-2,3-difluoro-4-biphenyl (25 g), n-butyl-lithium (1.6M hexane solution) (55 ml) and THF were combined slowly at $-70$ °C. under $N_2$.

Trimethyl borate (11 ml) was then added and the mixture was stirred. The crude product was isolated after hydrolysis with hydrochloric acid.

Step 10.3

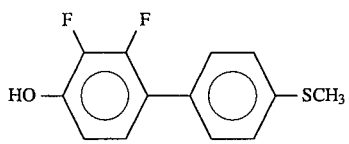

4'-Thiomethyl-2-,3-difluoro-4-biphenyl boronic acid (4.0 g), and hydrogen peroxide (10 ml, 30%) were heated. The crude product was purified by recrystallisation and column chromatography.

Step 10.4

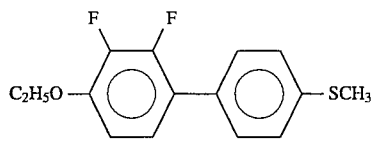

4'-Thiomethyl-2,3-difluorobiphenyl-4-ylol (2,5 g), 25 ml Dimethylformamid 10 g $K_2CO_3$ and 2 g iodoethane are heated.

The crude product was purified by recrystallation and column chromatography, K 94 I, Δn 0.21.

The following compounds of the formula

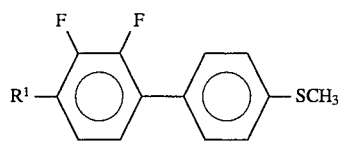

are prepared analogously:

| $R^1$ | | |
|---|---|---|
| $C_2H_5$ | | |
| n-$C_3H_7$ | | |
| n-$C_4H_9$ | | |
| n-$C_6H_{13}$ | | |
| n-$C_7H_{15}$ | | K 41.7 I, Δn = 0.156 |
| $C_3H_7$— | —$CH_2$—O | K 91 N 132 I, Δn 0.20 |

Use-Example 1

A display cell was composed of two opposite plates which are transparent to light and which are provided with an electrode of a material which is transparent to light and with rubbed polyimide layers. In the cell there was provided the liquid crystalline material consisting of the materials a) and b), for which purpose 5% of diacrylate was used, represented by formula IIA 1 a (known under the indication C6H), which diacrylate was added to 95 parts of a liquid crystalline material.

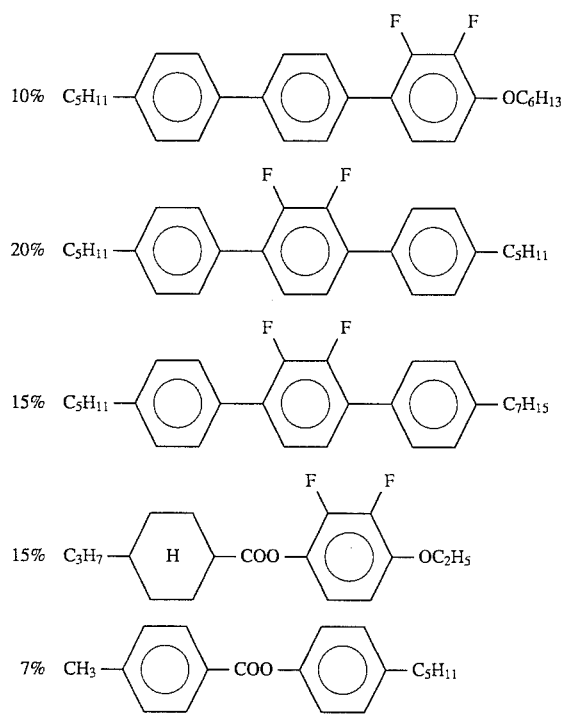

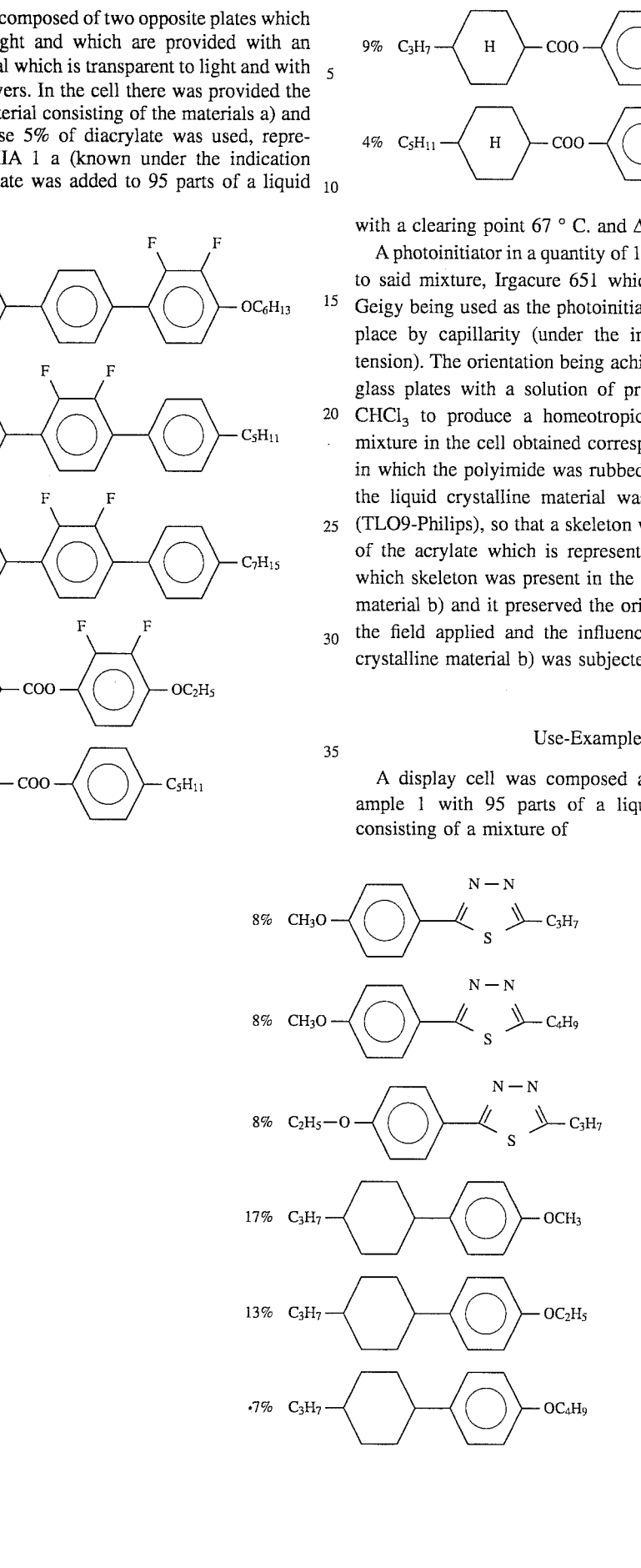

with a clearing point 67° C. and Δn=0.157.

A photoinitiator in a quantity of 1 part by weight as added to said mixture, Irgacure 651 which is marketed by Ciba Geigy being used as the photoinitiator. The provision takes place by capillarity (under the influence of the surface tension). The orientation being achieved by pre-coating the glass plates with a solution of propyl trichloro silane in $CHCl_3$ to produce a homeotropic alignment of the LC mixture in the cell obtained corresponds with the direction in which the polyimide was rubbed. After said orientation, the liquid crystalline material was exposed to UV light (TLO9-Philips), so that a skeleton was formed on tile basis of the acrylate which is represented by formula (IIA1a), which skeleton was present in the continuous phase of the material b) and it preserved the orientation independent of the field applied and the influences to which the liquid crystalline material b) was subjected.

Use-Example 2

A display cell was composed analogously to Use-Example 1 with 95 parts of a liquid crystalline material consisting of a mixture of

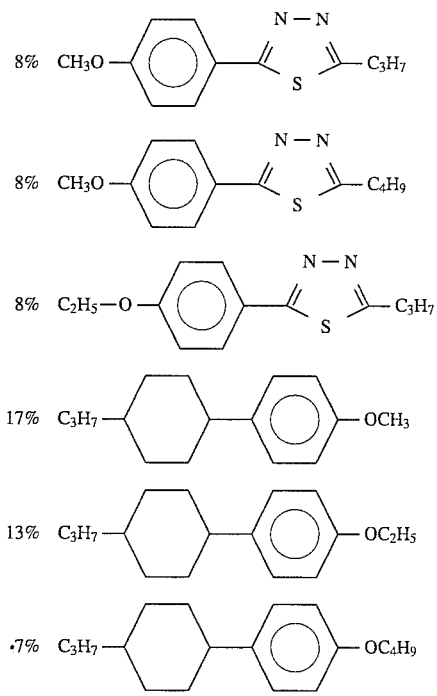

5% 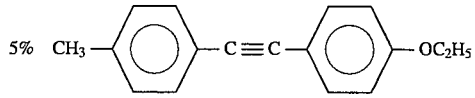
4% 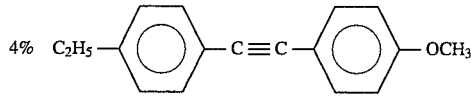
8% 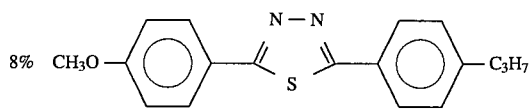
6% 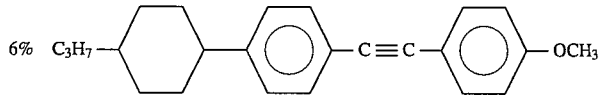
5% 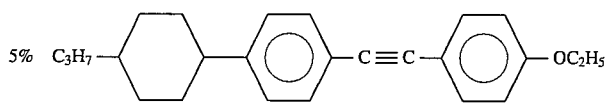
7% 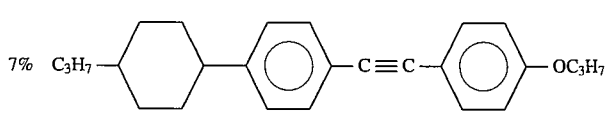
4% 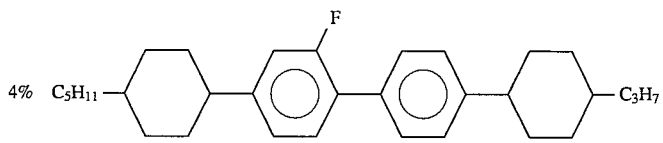
Use-Example 3
A display cell was composed analogously to Use-Example 1 with 95 parts of a liquid crystalline material consisting of a mixture of
10% 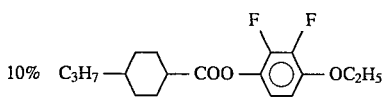
10% 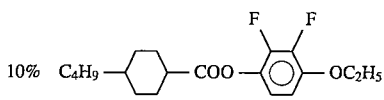
10% 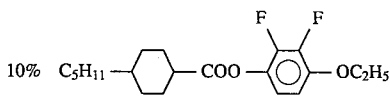
17% 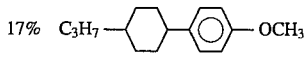
12% 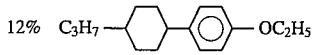
5% 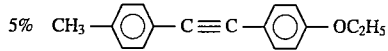
4% 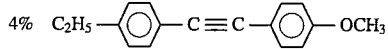
7% 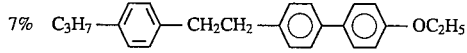
7% 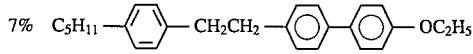
6% 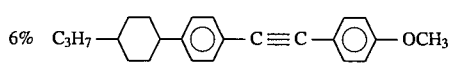
5% 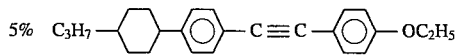
7% 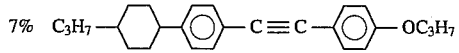
with clearing point 87 °C., An=0.168 and Δε=−2.1.
Use Example 4
A display cell was composed analogously to Use-Example 1 with 95 parts of a liquid-crystalline material consisting of a mixture of
20% 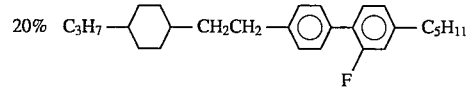
9% 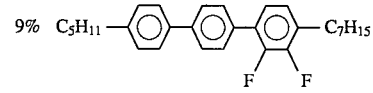
9% 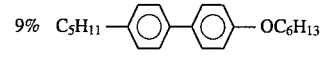
8% 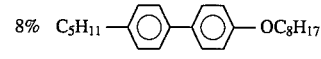
9% 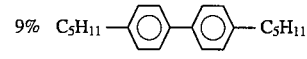

-continued

10% C₃H₇—⌬—⌬—OC₂H₅
         F  F

20% C₃H₇—⌬—COO—⌬—OC₂H₅

5.43% CH₃—⌬—COO—⌬—C₅H₁₁

6.37% C₃H₇—⌬—COO—⌬—C₅H₁₁

3.20% C₅H₁₁—⌬—COO—⌬—C₅H₁₁ with clearing point 75.5 °C., Δn=0,149 and Δεe=−2.6.

Use Example 5

A display cell was composed analogously to Use-Example 1 with 95 parts of a liquid-crystalline mixture consisting of:

13.8% C₅H₁₁—⌬—⌬—⌬—C₅H₁₁
              F  F 26.1% C₅H₁₁—⌬—⌬—⌬—C₇H₁₅
            F  F 34.7% C₂H₅—⌬—⌬—⌬—C₃H₇
           F  F 13.1% C₃H₇—⌬—⌬—⌬—C₅H₁₁
           F  F 12.3% C₃H₇—⌬—⌬—OC₂H₅
              F  F with clearing point 98.5 °C., Δn=0.225 and Δεs=−2.7.

Use Example 6

A display cell was composed analogously to Use Example 1 with 95 parts of a liquid-crystalline mixture consisting of:

14.0% C₅H₁₁—⌬—⌬—⌬—C₅H₁₁
              F  F 16.0% C₅H₁₁—⌬—⌬—⌬—C₇H₁₅
              F  F 25.0% C₂H₅—⌬—⌬—⌬—C₃H₇
            F  F 13.0% C₃H₇—⌬—⌬—⌬—C₅H₁₁
            F  F

-continued 12.0% C₃H₇—⌬—⌬—OC₂H₅
           F  F 10.0% C₃H₇—⌬—⌬—OC₄H₉
           F  F 10.0% C₅H₁₁—⌬—⌬—OC₄H₉
            F  F with clearing point 73.4° C., Δn=0.1984 and Δε= −3.5.

We claim:

1. A liquid crystalline material in the form of an anisotropic gel consisting of a polymerized monotropic or enantiotropic liquid crystalline material and a low-molecular weight liquid crystalline material, wherein the polymerized material a) forms a permanently oriented network in the low-molecular weight liquid crystalline material b), which the low-molecular weight liquid crystalline material b) is a liquid crystalline medium which exhibits a dielectric anisotropy Δε≦−0.5 and comprises at least two components wherein at least one component is a mesogenic compound comprising a structure element of formula 1

2. A liquid crystalline material of claim 1, wherein material b) forms a continuous phase around the network of material a).

3. A liquid crystalline material of claim 1, wherein material a) is an acrylate, epoxy compound, vinyl ether compound or thiolene compound.

4. A liquid crystalline material in the form of an anisotropic gel consisting of a polymerized monotropic or enantiotropic liquid crystalline material and a low-molecular weight liquid liquid crystalline material b), wherein the polymerized material a) forms a permanently oriented network in the low-molecular weight liquid liquid crystalline material b), which low-molecular weight liquid crystalline material b) is a liquid crystalline medium which exhibits a dielectric anisotropy Δε≦−0.5, and comprises at least two components wherein at least one component is a mesogenic compound of formulae I

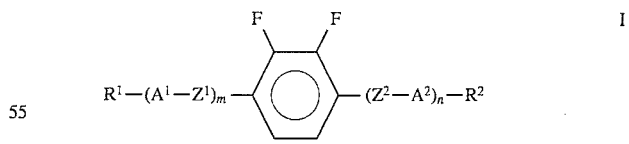

wherein
R¹ and R² are each independently alkyl or alkenyl with up to 16 C atoms, in which one or two non-adjacent CH₂ groups may be replaced by —O—, —S—, —CO—O—, —O—CO— or —O—CO—O—,
A¹ and A² are each independently optionally fluorinated 1,4-phenylene in which one or two CH₂ groups may be replaced by O,
Z¹ and Z² are each independently —CO—O—, —O—CO—, —OCH₂—, —CH₂O—, —CH₂CH₂—, —C≡C—, —C≡C—C≡C— or a single bond, and m and n are each independently 0, 1, 2 or 3 with the proviso that the sum of m+n is 1, 2 or 3.

5. A liquid crystalline material according to claim 1, of the formula Ia

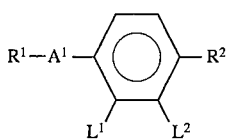   Ia in which

R¹ is an alkyl or an alkenyl group each having up to 12 C atoms and in which, in addition one or more non-adjacent CH$_2$ groups may be replaced by a divalent radical selected from —O—, —S—, —CO—, —O—CO— and —CO—O—, A¹ is a divalent ring structure selected from

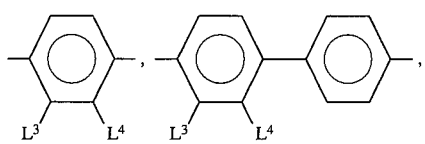

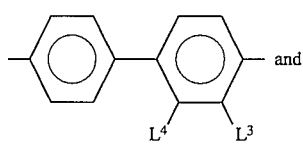

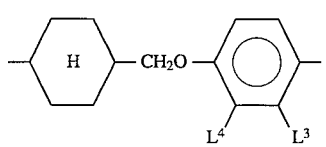

R² is a thio alkyl or an alkoxy group each having up to 7 C atoms and in which, in addition one or more non-adjacent CH$_2$ groups may be replaced by a divalent radical selected from —O—, —CO— and —CH=CH—, and L¹ to L⁴ are each H or F with the proviso that L¹=L²=F and/or L³=L⁴=F.

6. A liquid crystalline material of claim 3 wherein the material a) is a polymerizable rod-like compound of the formula II

R¹—P—X—A³—Z—A⁴—R²   II wherein

R¹ is CH$_2$=CW—COO—,

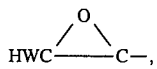

HWN—, CH$_2$=CH— or HS—CH$_2$— (CH$_2$)$_m$— COO— with W being H, Cl or alkyl with 1–5 C atoms and m being 1–7

P is alkylene with up to 12 C atoms, it being also possible for one or more non adjacent CH$_2$ groups to be replaced by —O—, R² is an alkyl radical with up to 15 C atoms which is unsubstituted, mono- or polysubstituted by halogen, it being also possible for one or more CH2 groups in these radicals to be replaced, in each case independently of one another, by —O—, —S—, —CO—, —OCO—, —CO—O— or —O—CO—O— in such a manner that oxygen atoms are not linked directly to one another, or alternatively R² has one of the meanings given for R¹—P—X—, A³ is a 1,4-phenylene or a naphthalene-2,6-diyl radical which is unsubstituted or substituted with 1 to 4 halogen atoms, A⁴ is (a) 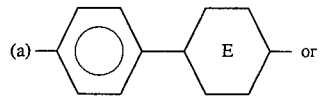 or (b) 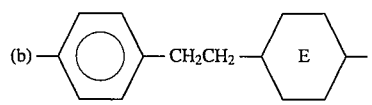

with 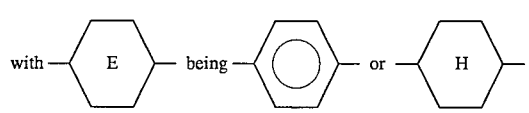

it being possible for radicals (a) and (b) to be substituted by CN or halogen and one of the 1,4-phenylene groups in (a) and (b) may also be replaced by a 1,4-phenylene radical in which one or two CH groups are replaced by N, and Z is —CO—O—, —O—CO—, —CH$_2$CH$_2$— or a single bond.

7. A liquid crystalline material of claim 3, wherein the material a) is a acrylate of formula II $$CH_2=C-C-O-[(CH_2)_m-A]_n-B-[A-(CH_2)_m]_n-O-C-C=CH_2 \quad II$$
$$\parallel \; \mid \qquad\qquad\qquad\qquad\qquad\qquad\qquad\qquad \parallel \; \mid$$
$$O \; R \qquad\qquad\qquad\qquad\qquad\qquad\qquad\qquad\qquad O \; R$$

wherein A is —O—, —CO—O—, —O—CO— or a single bond,

B is selected from —(CH$_2$)$_s$—

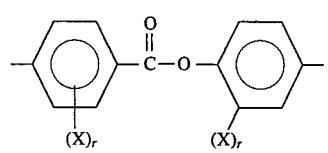

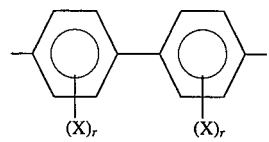

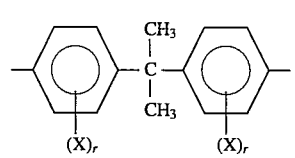

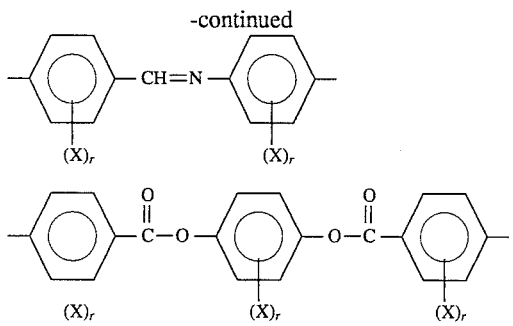

with X being $CH_3$, Cl or F and r being 0, 1 or 2,
s is an integer between 1 and 6, and
n and m are integers between 0 and 20.

8. A liquid crystalline material as claimed in claim 1, characterized in that material a) is present in the gel in a quantity of 1–50% by weight.

9. A liquid crystalline material as claimed in claim 8, characterized in that the material a) is present in the gel in a quantity of 5–20% by weight.

10. A liquid crystalline material according to claim 1, wherein the material b) exhibits a dielectric anisotropy $\Delta\epsilon < -1$ and an optic anisotropy $\Delta n \geq 0.15$.

11. A liquid crystalline material of claim 10, wherein the material b) contains at least one mesogenic tolane derivative comprising a structure element of formula 6

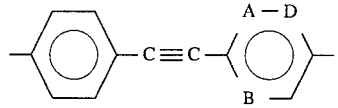

in which

A, B and D are each independently CH, CF or N.

12. A liquid crystalline material according to claim 11, wherein the tolane derivative exhibits a structure element of formula 6a

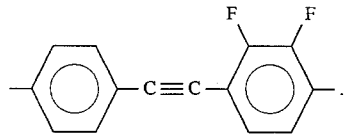

13. A liquid crystalline material as claimed in claim 1, wherein the material b) contains at least a mesogenic compound comprising a structure element of formula 7

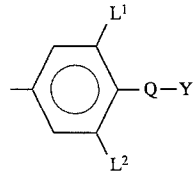

wherein $L^1$ and $L^2$ are each independently H or F,

Q is $-(O)_t-(CH_2)_u-(CF_2)_v-(CFH)_x$ t being 0 or 1 u being an integer between 0 and 8 v being an integer between 0 and 9 x being an integer between 0 and 8 with the proviso that the sum of v and x is at least 1, or a single bond, and Y is F or Cl.

14. A display cell comprising two opposite plates which are transparent to light as the substrate, which plates are provided with an electrode of a material which is transparent to light on the sides facing each other, said electrode carrying an orientation layer and a sealing material being provided between the ends of the plates, a liquid crystalline material being introduced in the space between the plates and the sealing material, wherein in that the liquid crystalline material is composed of at least two different liquid crystalline materials, as indicated in claim 1.

15. A liquid crystalline material according to claim 5, which is an alkylthiobiphenyl of the formula Ia1

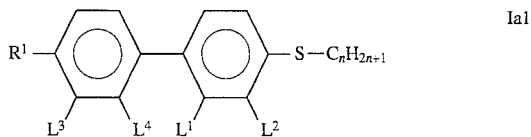

wherein n is 1 to 7.

16. A liquid crystalline material of claim 15, wherein $L^3=L^4=F$, $L^1=L^2=H$ and $R^1$ is a straight-chain alkoxy group of up to 12 C atoms.

17. A liquid crystalline material of claim 16, having n=1.

18. A liquid crystalline material according to claim 5, which is an alkylthiobiphenyl of the formula Ia2

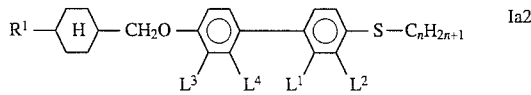

wherein n is 1 to 7.

19. A liquid crystalline material in the form of an anisotropic gel consisting of a polymerized monotropic or enantiotropic liquid crystalline material and a low-molecular weight liquid crystalline material, wherein the polymerized material a) is present in the gel in an amount of 1–50% by weight, and forms a permanently oriented network in the low-molecular weight liquid crystalline material b), which low-molecular weight liquid crystalline material b) is a liquid crystalline medium which exhibits a dielectric anisotropy $\Delta\epsilon \leq -0.5$, and comprises at least two components wherein at least one component is a mesogenic compound of formula I

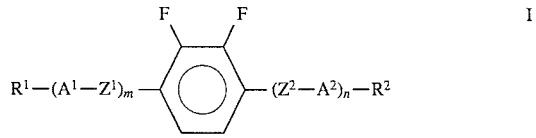

wherein $R^1$ and $R^2$ are each independently alkyl or alkenyl with up to 16 C atoms, in which one or two non-adjacent $CH_2$ groups may be replaced by $-O-$, $-S-$, $-CO-O-$, $-O-CO-$ or $-O-CO-O-$, $A^1$ and $A^2$ are each independently optionally fluorinated 1,4-phenylene in which one or two $CH_2$ groups may be replaced by O, $Z^1$ and $Z^2$ are each independently $-CO-O-$, $-O-CO-$, $-OCH_2-$, $-CH_2O-$, $-CH_2CH_2-$, $-C\equiv C-$, $-C\equiv C-C\equiv C-$ or a single bond, and m and n are each independently 0, 1, 2 or 3 with the proviso that the sum of m+n is 1, 2 or 3.

* * * * *